(12) United States Patent
Han et al.

(10) Patent No.: US 7,876,927 B2
(45) Date of Patent: *Jan. 25, 2011

(54) METHOD AND SYSTEM FOR GUIDING A VEHICLE WITH VISION-BASED ADJUSTMENT

(75) Inventors: Shufeng Han, Johnston, IA (US); Terence Daniel Pickett, Waukee, IA (US); John Franklin Reid, Moline, IL (US)

(73) Assignee: Deere & Company, Moline, IL (US)

( * ) Notice: Subject to any disclaimer, the term of this patent is extended or adjusted under 35 U.S.C. 154(b) by 908 days.

This patent is subject to a terminal disclaimer.

(21) Appl. No.: 11/755,965

(22) Filed: May 31, 2007

(65) Prior Publication Data
US 2008/0065286 A1    Mar. 13, 2008

Related U.S. Application Data

(63) Continuation-in-part of application No. 11/107,114, filed on Apr. 15, 2005, now Pat. No. 7,233,683.

(60) Provisional application No. 60/641,240, filed on Jan. 4, 2005.

(51) Int. Cl.
*G06K 9/00* (2006.01)
*G08G 1/095* (2006.01)
*G08G 5/00* (2006.01)
*G08G 1/123* (2006.01)
*G01C 22/00* (2006.01)

(52) U.S. Cl. ................. 382/104; 340/944; 340/947; 340/995.25; 701/23

(58) Field of Classification Search ................. 382/104; 340/944, 985, 988, 995.25, 998; 701/23, 701/28, 200, 211, 213, 301
See application file for complete search history.

(56) References Cited

U.S. PATENT DOCUMENTS

| | | | |
|---|---|---|---|
| 5,610,815 A * | 3/1997 | Gudat et al. | 701/23 |
| 5,684,476 A | 11/1997 | Anderson | |
| 5,955,973 A | 9/1999 | Anderson | |
| 5,974,348 A | 10/1999 | Rocks | |
| 6,385,515 B1 | 5/2002 | Dickson et al. | |
| 6,445,983 B1 | 9/2002 | Dickson et al. | |

(Continued)

OTHER PUBLICATIONS

Foessel-Bunting A, Bares J, and Whittaker W. Three-Dimensional Map Building With MMW Radar [online], [retrieved on Apr. 15, 2005]. Retrieved from the Internet:<URL:www.ri.cmu.edu/pubs/pub_3758.text.html>.

(Continued)

*Primary Examiner*—Abolfazl Tabatabai

(57) ABSTRACT

A preliminary guidance data is determined for the vehicle during an evaluation time window. A vision module collects vision data from a vision module during the evaluation time window. Vision guidance data is determined from the collected vision data. A vision quality estimator estimates vision quality data for at least one of the vision data and the vision guidance data during the evaluation time window. The vision quality data is based on a cross correlations and an r-squared value. An adjuster adjusts the preliminary guidance data to a revised guidance data based on the vision guidance data such that the revised guidance data is registered with or generally coextensive with the vision guidance data, if the vision quality data exceeds a minimum threshold.

28 Claims, 15 Drawing Sheets

U.S. PATENT DOCUMENTS

| | | | |
|---|---|---|---|
| 6,490,539 B1 * | 12/2002 | Dickson et al. | 702/150 |
| 6,697,724 B2 | 2/2004 | Beck | |
| 6,760,654 B2 | 7/2004 | Beck | |
| 6,946,978 B2 * | 9/2005 | Schofield | 340/995.28 |
| 7,242,791 B2 | 7/2007 | Han et al. | |
| 2002/0105428 A1 | 8/2002 | Benson et al. | |
| 2002/0106108 A1 | 8/2002 | Benson et al. | |
| 2006/0147088 A1 | 7/2006 | Han et al. | |
| 2006/0147089 A1 | 7/2006 | Han et al. | |
| 2006/0149417 A1 | 7/2006 | Han et al. | |
| 2006/0149472 A1 | 7/2006 | Han et al. | |
| 2007/0001096 A1 | 1/2007 | Wei et al. | |

OTHER PUBLICATIONS

Welch G and Bishop G. Scaat: Incremental Tracking with Incomplete Information. International Conference on Computer Graphics and Interactive Techniques [online], Aug. 1997 [retrieved on Apr. 15, 2004]. Retrieved from the Internet: <URL:www.cs.unc.edu/~welch/publications.html>.

Roth S and Singh S. Application of Robust, High-Accuracy Positioning for Autonomous Ground Vehicles [online]; Aug. 2004 [retrieved on Apr. 15, 2005]. Retrieved from the Internet<URL:www.ri.cmu.edu/pubs/pub_4804_text.html>.

Wagner M, O'Hallaron D, Apostolopoulos D, and Urmson C. Principles of Computer System Design for Stereo Perception [online], Jan. 17, 2002 [retrieved on Apr. 15, 2005]. Retrieved from the Internet: <URL:frc.ri.cmu.edu/~mwagner/publications/18_980_final_report.pdf>.

Chatterji, G.B.; Menon, P.K.; and Sridhar, B. GPS/Machine Vision Navigation System for Aircraft. IEEE Transactions on Aerospace and Electronic Ssytems, vol. 33, No. 3 (Jul. 1997), pp. 1012-1025.

Guo, L.S.; Zhang, Q.; and Feng, L. A Low-Cost Integrated Positioning System of GPS and Inertial Sensors for Autonomous Agricultural Vehicles. ASAE Meeting Paper No. 033112 (Jul. 27-30, 2003).

Han, S.; Zhang, Q.; and Noh, H.K. Applying Filtering Techniques to Improve GPS Positioning Accuracy. ASAE Meeting Paper No. 01-1158 (Jul. 30-Aug. 1, 2001).

Noguchi, N.; Reid, J.F.; Will, J.; Benson, E.R.; and Stombaugh, T.S. Vehicle Automation System Based on Multi-Sensor Integration. ASAE Meeting Paper No. 983111 (1998).

You, S. and Neumann, U. Fusion of Vision and Gyro Tracking for Robust Augmented Reality Registration. In Proc. IEEE Virtual Reality, (2001) pp. 71-78.

* cited by examiner

DGPS Static Positioning Error

DGPS by "Tuning" Positioning Error

METHOD AND SYSTEM FOR GUIDING A VEHICLE WITH VISION-BASED ADJUSTMENT

This is a continuation-in-part of U.S. application Ser. No. 11/107,114, filed Apr. 15, 2005 now U.S. Pat. No. 7,233,683, which claims the benefit of U.S. Provisional Application No. 60/641,240, filed Jan. 4, 2005 under 35 U.S.C. 119(e).

FIELD OF THE INVENTION

This invention relates to a method and system for guiding a vehicle with vision adjustment.

BACKGROUND OF THE INVENTION

Global Positioning System (GPS) receivers have been used for providing position data for vehicular guidance applications. However, although certain GPS receivers with differential correction may have a general positioning error of approximately 10 centimeters (4 inches) during a majority of their operational time, an absolute positioning error of more than 50 centimeter (20 inches) is typical for five percent of their operational time. Further, GPS signals may be blocked by buildings, trees or other obstructions, which can make GPS-only navigation system unreliable in certain locations or environments. Accordingly, there is a need for supplementing or enhancing a GPS-based navigation system with one or more additional sensors to increase accuracy and robustness.

SUMMARY OF THE INVENTION

A location-determining receiver collects preliminary location data for a vehicle during an evaluation time window. Preliminary guidance data is determined from the preliminary location data. A vision module collects vision data during the evaluation time window. Vision guidance data is determined from the collected vision data. A vision quality estimator estimates vision quality data for at least one of the vision data and the vision guidance data for the evaluation time window. The vision quality data is based on cross correlations and an r-squared value, where each cross correlation is between an observed intensity profile of the vision data in a section and a reference intensity profile to determine a row center position. The r-squared value is determined based on a regression path and one or more row center positions. An adjuster adjusts the preliminary guidance data to revised guidance data based on the vision guidance data such that the revised guidance data is registered with or generally coextensive with the vision guidance data, if the vision quality data exceeds a minimum threshold.

DESCRIPTION OF THE PREFERRED EMBODIMENT

Figure 1:
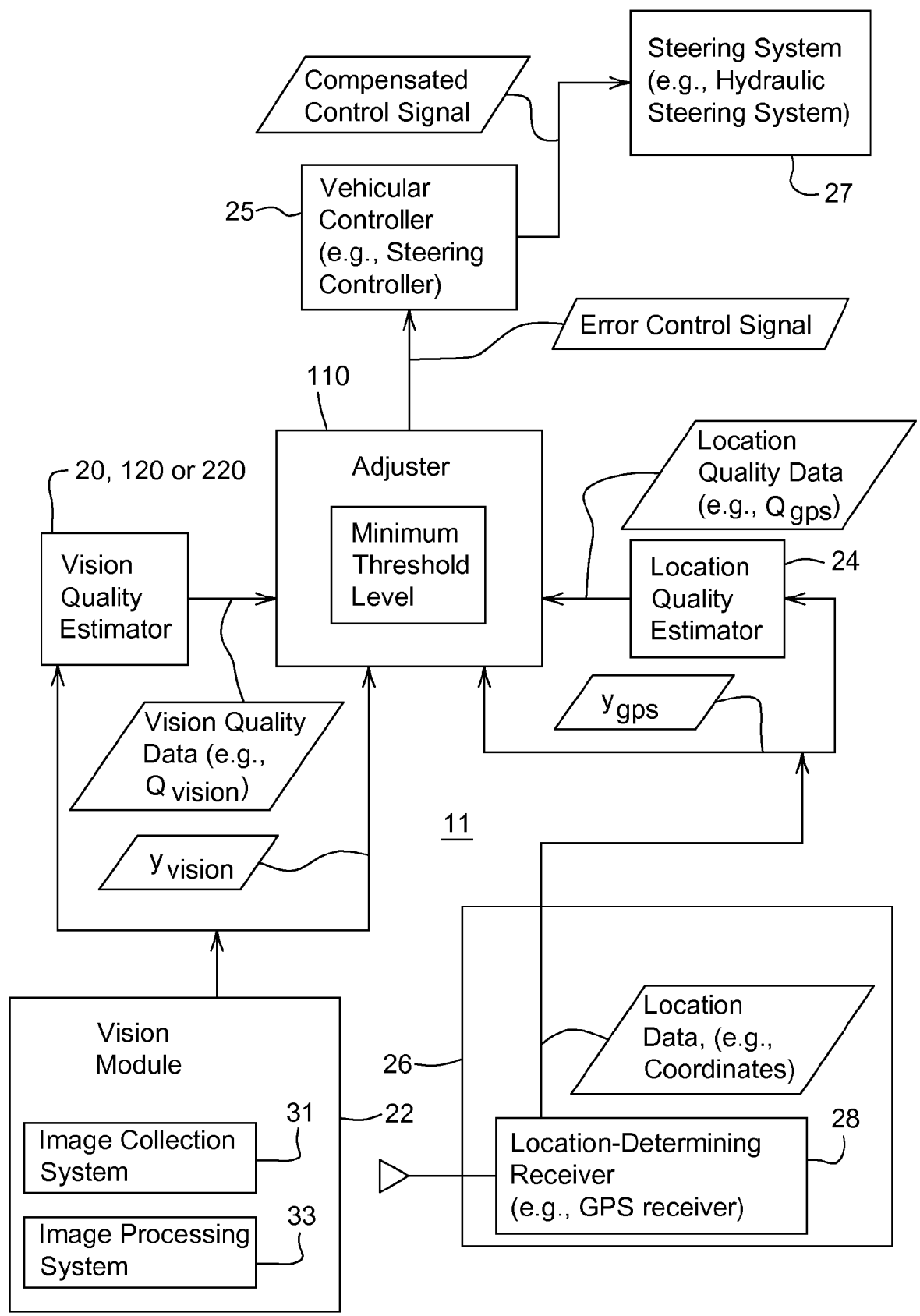
FIG. 1 is a block diagram of a system for guiding a vehicle based on preliminary guidance data (e.g., preliminary location data) and vision guidance data (e.g., vision-derived location data) in accordance with the invention.

FIG. 1 is a block diagram of a guidance system 11 for guiding a vehicle. The guidance system 11 may be mounted on or collocated with a vehicle or mobile robot. The guidance system 11 comprises a vision module 22 and a location-determining receiver 28 that communicate with an adjuster 110.

The vision module 22 may be associated with a vision quality estimator (20 or 120). The location-determining receiver 28 may be associated with a location quality estimator 24. The adjuster 110 may communicate with a vehicular controller 25. In turn, the vehicular controller 25 is coupled to a steering system 27.

The location-determining receiver 28 may comprise a Global Positioning System (GPS) receiver with differential correction (e.g., a GPS receiver and a receiver for receiving a differential correction signal transmitted by a satellite or terrestrial source). The location determining receiver 28 provides location data (e.g., coordinates) of a vehicle. The location-determining receiver 28 may indicate one or more of the following conditions, states, or statuses (e.g., via a status signal) to at least the adjuster 110 or the location quality estimator 24: (1) where the location-determining receiver 28 is disabled, (2) where location data is not available or corrupt for one or more corresponding evaluation intervals, and (3) where the estimated accuracy or reliability of the location data falls below a minimum threshold for one or more evaluation intervals. The location-determining receiver 28 provides location data for a vehicle that is well-suited for global navigation or global path planning.

The location module 26 or data processor associated with the location module 26 determines guidance data from the collected location data. Guidance data means one or more of the following data that is derived from location data associated with the location-determining receiver 28: heading data, heading error data, off-track data, off-track error data, curvature data, curvature error data, vision-derived location data, and location error data. Guidance data generally refers to one or more of the following items: preliminary guidance data, revised guidance data, and vision guidance data.

In one embodiment, the location module 26 may determine guidance data to guide or steer the vehicle such that the vehicular path intercepts one or more target coordinates (e.g., way points) or paths associated with the target coordinates. The location module 26 may communicate with or receive information on the target coordinates, or paths via a path planner, a data processing system, a wireless communications device, a magnetic storage media, an optical storage media, electronic memory, or otherwise. For example, the target coordinates or paths may be expressed as a path plan or a sequence of coordinates that are based on crop rows or an as-planted map of a field. The as-planted map of the field may be collected by a location-determining receiver 28 or another location-determining device during planting of a seed, a crop, a plant, or a precursor to the crop.

In one illustrative embodiment, the location module 26 or location-determining receiver 28 outputs guidance data (e.g., location data) in the following format:

$$y_{gps} = \begin{bmatrix} E_{off\_gps} \\ E_{head\_gps} \end{bmatrix},$$

where $E_{off\_gps}$ is the off-track error estimated by the location-determining receiver 28 (e.g., location-determining receiver 28), and $E_{head\_gps}$ is the heading error estimated by the location-determining receiver 22.

The vision module 22 may comprise an image collection system 31 and an image processing system 33. The vision module 22 or image collection system 31 collects image data or vision data, which shall be regarded as synonymous terms throughout this document. The vision module 22 or image processing system 33 derives vision guidance data (e.g., vision-derived location data) from the collected image data or vision data. The vision guidance data means one or more of the following data that is derived from vision data associated with the vision module 22: heading data, heading error data, off-track data, off-track error data, curvature data, curvature error data, vision-derived location data, location data, and location error data.

In one embodiment, the vision module 22 may determine vision guidance data to guide or steer the vehicle such that the vehicular path intercepts one or more target coordinates (e.g., way points) or paths associated with the target coordinates. The vision module 22 may communicate with or receive information on the target coordinates, or paths via a path planner, a data processing system, a wireless communications device, a magnetic storage media, an optical storage media, electronic memory, or otherwise. For example, the target coordinates or paths may be expressed as a path plan or a sequence of coordinates that are based on collected images of crop rows or representations derived from the collected images. In one example, a vision module 22 is able to identify plant row location with an error as small as approximately 1 centimeter for soybeans and approximately 2.4 centimeter for corn.

In one illustrative example, the vision module 22 outputs vision guidance data (e.g., vision-derived location data) in the following format:

$$y_{vision} = \begin{bmatrix} E_{off\_vision} \\ E_{head\_vision} \end{bmatrix},$$

where $E_{off\_vision}$ is the off track error estimated by the vision module 22 and $E_{head\_vision}$ is the heading error estimated by the vision module 22.

The image collection system 31 may comprise one or more of the following: (1) one or more monocular imaging systems for collecting a group of images (e.g., multiple images of the same scene with different focus settings or lens adjustments, or multiple images for different field of views (FOV)); (2) a stereo vision system (e.g., two digital imaging units separated by a known distance and orientation) for determining depth information or three-dimensional coordinates associated with points on an object in a scene; (3) a range finder (e.g., laser range finder) for determining range measurements or three-dimensional coordinates of points on an object in a scene; (4) a ladar system or laser radar system for detecting the speed, altitude, direction or range of an object in a scene; (5) a scanning laser system (e.g., a laser measurement system that transmits a pulse of light and estimates distance between the laser measurement system and the object based on the time of propagation between transmission of the pulse and reception of its reflection) for determining a distance to an object in a scene; and (6) an imaging system for collecting images via an optical micro-electromechanical system (MEMS), free-space optical MEMS, or an integrated optical MEMS.

Free-space optical MEMS use compound semiconductors and materials with a range or refractive indexes to manipulate visible light, infra-red, or ultraviolet light, whereas integrated optical MEMS use polysilicon components to reflect, diffract, modulate or manipulate visible light, infra-red, or ultraviolet light. MEMS may be structured as switching matrixes, lens, mirrors and diffraction gratings that can be fabricated in accordance with various semiconductor fabrication techniques. The images collected by the vision module 22 or image collection system 31 may be in color, monochrome, black-and-white, or grey-scale images, for example.

The vision module 22 or vision-derived location data may support the collection of position data (in two or three dimensional coordinates) corresponding to the location of features of an object within the image. The vision module 22 is well suited for using (a) features or local features of an environment around a vehicle, (b) position data or coordinates associated with such features, or both to facilitate navigation of the vehicle. The local features may comprise one or more of the following: plant row location, fence location, building location, field-edge location, boundary location, boulder location, rock locations (e.g., greater than a minimum threshold size or volume), soil ridge and furrows, tree location, crop edge location, a cutting edge on vegetation (e.g., turf), and a reference marker. The vision guidance data (e.g., vision-derived location data) or position data of local features may be used to tune (e.g., correct for drift) the preliminary guidance data (e.g., preliminary location data) from the location-determining receiver 28 on a regular basis (e.g., periodically).

In one example, a reference marker may be associated with high precision location coordinates. Further, other local features may be related to the reference marker position. The current vehicle position may be related to the reference marker position or the fixed location of local features or the location of the vehicle. In one embodiment, the vision module 22 may express the vision-derived location data on the vehicle location in coordinates or a data format that is similar to or substantially equivalent to the coordinates or data format of the location-determining receiver 28.

The vision module 22 may indicate one or more of the following via a status or data message to at least the adjuster 110 or the vision quality estimator 20: (1) whether the vision module 22 is disabled, (2) whether vision guidance data (e.g., vision-derived location data) is not available during one or more evaluation intervals, (3) whether the vision guidance data (e.g., vision-derived location data) is unstable or corrupt, and (4) whether the image data or vision guidance data is subject to an accuracy level, a performance level or a reliability level that does not meet a threshold performance/reliability level.

The location quality estimator 24 may comprise one or more of the following devices: a signal strength indicator associated with the location-determining receiver 28, a bit error rate indicator associated with the location-determining receiver 28, another device for measuring signal quality, an error rate, signal strength, or performance of signals, channels, or codes transmitted for location-determination. Further, for satellite-based location-determination, the location quality estimator 24 may comprise a device for determining whether a minimum number of satellite signals (e.g., signals from four or more satellites on the L1 band for GPS) of a sufficient signal quality are received by the location-determining receiver 28 to provide reliable location data for a vehicle during an evaluation interval.

The location quality estimator 24 estimates the quality of the preliminary location data or location quality data (e.g., $Q_{gps}$) outputted by the location-determining receiver 28. The location quality estimator 24 may estimate the quality of the preliminary location data based on the signal strength indicator (or bit-error rate) of each signal component received by the location-determining receiver 28. The location quality estimator 24 may also base the quality estimate on any of the following factors: (1) the number of satellite signals that are available in an area, (2) the number of satellites that are acquired or received by the location-determining receiver with a sufficient signal quality (e.g., signal strength profile) and (3) whether each satellite signal has an acceptable signal level or an acceptable bit-error rate (BER) or frame-error rate (FER).

In one embodiment, different signal strength ranges are associated with different corresponding quality levels. For example, the lowest signal strength range is associated with the low quality, a medium signal strength range is associated with a fair quality, and highest signal strength range is associated with a highest quality. Conversely, the lowest bit-error rate range is associated with the highest quality, the medium bit error range is associated with the fair quality, and the highest bit error rate range is associated with the lowest quality level.

The vision quality estimator 20 estimates the quality of vision guidance data (e.g., the vision-derived location data) outputted by the vision module 22. The quality of the vision guidance data may be expressed as vision quality data (e.g., $Q_{vision}$). The vision quality estimator 20 may consider the illumination present during a series of time intervals in which the vision module 22 operates and acquires corresponding images. The vision quality estimator 20 may include a photo-detector, a photo-detector with a frequency selective lens, a group of photo-detectors with corresponding frequency selective lenses, a charge-coupled device (CCD), a photometer, cadmium-sulfide cell, or the like. Further, the vision quality estimator 30 comprises a clock or timer for time-stamping image collection times and corresponding illumination measurements (e.g., luminance values for images). In one illustrative example, if the illumination is within a low intensity range, the vision quality is low for the time interval; if the illumination is within a medium intensity range, the vision quality is high for the time interval; and if the illumination is within a high intensity range, the vision quality is fair, low or high for the time interval depending upon defined sub-ranges within the high intensity range. The foregoing intensity range versus quality may be applied on a light frequency by light frequency or light color basis, in one example. In another example, the intensity range versus quality may be applied for infra-red range frequencies and for ultraviolet range frequencies differently than for visible light.

The vision quality estimation may be related to a confidence measure in processing the images. If the desired features (e.g., plant rows) are apparent in one or more images, the vision quality estimator 20 may assign a high image quality or high confidence level for the corresponding images. Conversely, if the desired features are not apparent in one or more images (e.g., due to missing crop rows), the vision quality estimator 20 may assign a low image quality or a low confidence level. In one example, the confidence level is determined based on a sum of the absolute-differences (SAD) of the mean intensity of each column vector (e.g., velocity vector for the vision module 22) for the hypothesized yaw/pitch pair. Yaw may be defined as the orientation of the vision module 22 in an x-y plane and pitch may be defined as the orientation of the vision module 22 in the x-z plane, which is generally perpendicular to the x-y plane.

If the vision module 22 is unable to locate or reference a reference feature or reference marker in an image or has not referenced a reference marker in an image for a threshold maximum time, the vision module 22 may alert the vision quality estimator 20, which may degrade the quality of the vision-derived location data by a quality degradation indicator.

In general, the adjuster 110 comprises a data processor, a microcontroller, a microprocessor, a digital signal processor, an embedded processor or any other programmable (e.g., field programmable) device programmed with software instructions. The adjuster 110 may be associated with a vehicle controller 25. In one embodiment, the adjuster 110 comprises a rule manager. The rule manager of the adjuster 110 may apply the preliminary guidance data (e.g., preliminary location data), or a derivative thereof, as the error control signal for a corresponding time interval, unless the vision quality data exceeds the minimum threshold level. No adjustment may be required unless the preliminary guidance data (e.g., preliminary location data) and the vision guidance data (e.g., vision-derived location data) differ by more than a maximum tolerance. The vision weight determines the extent that the contribution of the vision guidance data (e.g., $y_{vision}$) from the vision module 22 governs. The location weight determines the extent that the contribution of guidance data (e.g., location data) from the location module 22 governs. The mixer 14 determines the relative contributions of guidance data (e.g., $y_{gps}$) and vision guidance data (e.g., $y_{vision}$) to the error control signal (e.g., y) based on the both the vision weight and the location weight. In one embodiment, the mixer 14 may comprise a digital filter, a digital signal processor, or another data processor arranged to apply one or more of the following: (1) the vision guidance data weight (e.g., vision-derived location data weight), (2) the location data weight, and (3) a mixing ratio expression of the relative contributions of the location data and the vision-derived location data for an evaluation time interval.

The error control signal represents a difference (or an error) between the estimated guidance data and the actual guidance data to align the vehicle to a track a target coordinates or a target path. For example, the error control signal may represent the difference (or error) between location data (measured by the vision module 22 and by the location module 26) and the actual location of the vehicle. Such an error control signal is inputted to the vehicle controller 25 to derive a compensated control signal. The compensated control signal corrects the management and control of the steering system 27 based on the error control signal. The steering system 27 may comprise an electrical interface for communications with the vehicle controller 25. In one embodiment, the electrical interface comprises a solenoid-controlled hydraulic steering system or another electromechanical device for controlling hydraulic fluid.

In another embodiment, the steering system 27 comprises a steering system unit (SSU). The SSU may be associated with a heading versus time requirement to steer or direct the vehicle along a desired course or in conformance with a desired or target path plan or target coordinates. The heading is associated with a heading error (e.g., expressed as the difference between the actual heading angle and the desired heading angle).

The SSU may be controlled to compensate for errors in the estimated position of the vehicle by the vision module 22 or the location-determining receiver 28. For example, an off-track error indicates or is representative of the actual position of the vehicle (e.g., in GPS coordinates) versus the desired position of the vehicle (e.g., in GPS coordinates). The off-track error may be used to modify the movement of the vehicle with a compensated heading. However, if there is no off-track error at any point in time or a time interval, an uncompensated heading may suffice. The heading error is a difference between actual vehicle heading and estimated vehicle heading by the vision module 22 and the location-determining receiver 28.

Figure 2:
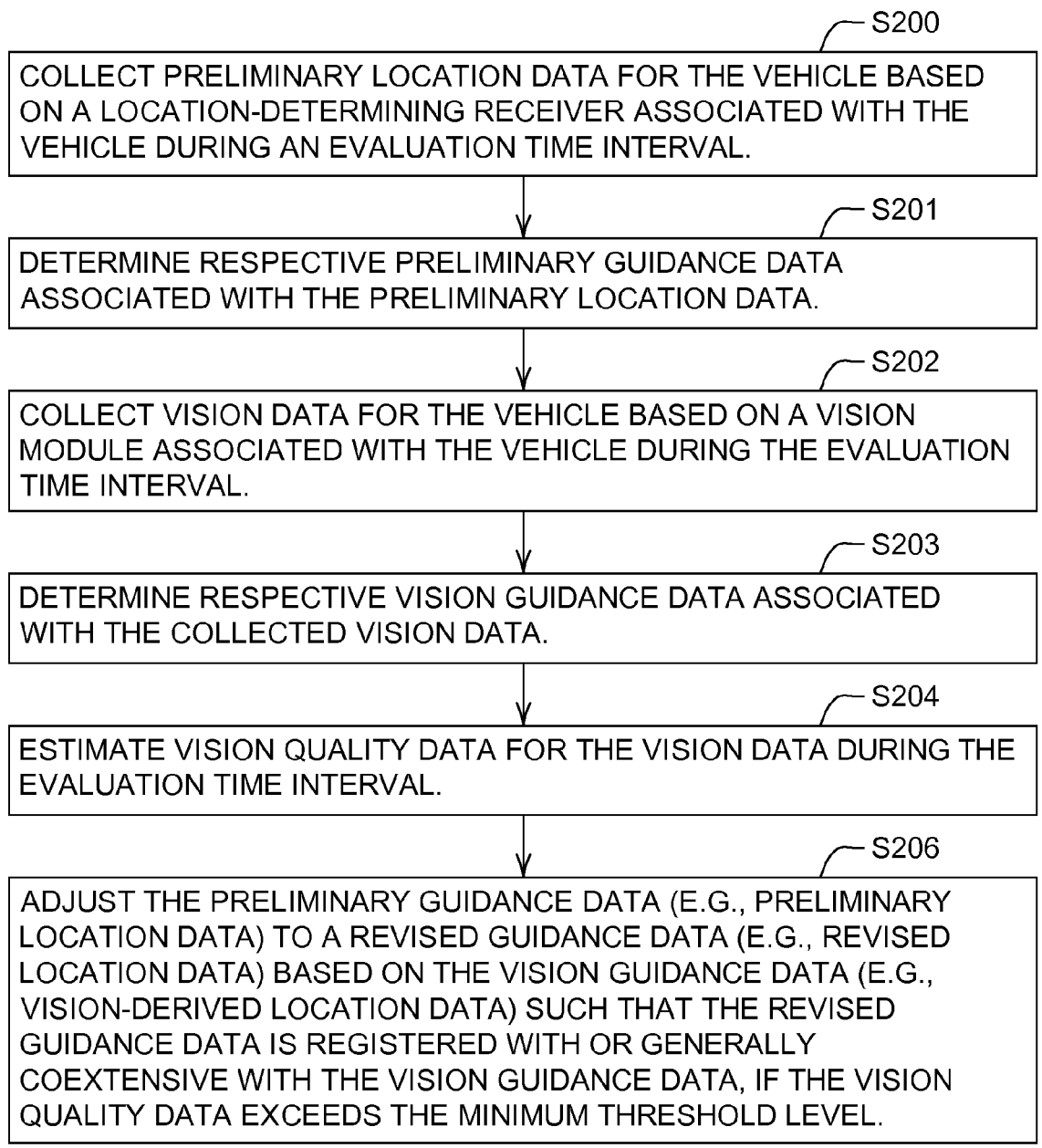
FIG. 2 is a flow chart of a method for guiding a vehicle based on preliminary guidance data (e.g., preliminary location data) and vision guidance data (e.g., vision-derived location data) in accordance with the invention.

FIG. 2 is a flow chart of a method for guiding a vehicle with a vision guidance data (e.g., vision-derived location data) and location data. The method of FIG. 2 begins in step S200.

In step S200, a location-determining receiver 28 collects preliminary location data for a vehicle associated therewith. For example, the location-determining receiver 28 (e.g., a GPS receiver with differential correction) may be used to determine coordinates of the vehicle for one or more evaluation time intervals or corresponding times.

In step S201, a location module 26 or a location-determining receiver 28 determines respective guidance data associated with the preliminary location data. Guidance data comprises one or more of the following items that are derived from the collected preliminary location data: heading data, heading error data, off-track data, off-track error data, curvature data, curvature error data, and a location-error signal. The heading data refers to the direction (e.g., angular orientation) of a vehicle (e.g., a longitudinal axis of the vehicle) relative to a reference direction (e.g., magnetic North). The heading error is a difference between actual vehicle heading and target vehicle heading. The heading error may be associated with errors (e.g., measurement error, system errors, or both) in at least one of the vision module 22, the location module 26, the vehicle controller 25, or the steering system 27. Off-track data indicates a displacement of the vehicle path position from a desired vehicle path position. An off-track error indicates or is representative of the difference between the actual position of the vehicle (e.g., in GPS coordinates) and the desired position of the vehicle (e.g., in GPS coordinates). The curvature is the change of the heading on the desired path. For example, curvature is the rate of change of the tangent angle to the vehicle path between any two reference points (e.g., adjacent points) along the path.

The guidance error signal or the location-error signal (e.g., $y_{gps}$) may represent a (1) difference between the actual vehicular location and a desired vehicular location for a desired time, (2) a difference between the actual vehicular heading and a desired vehicular heading for a desired time or position, (3) or another expression of error associated with the location data or guidance data. The location-error signal may be defined, but need not be defined, as vector data.

In step S202, a vision module 22 collects vision data for the vehicle during the evaluation time window. For example, the vision module 22 may collect one or more images of crop rows in a general direction of travel as a vehicle moves in a field. each collected image may be associated with a corresponding evaluation time interval.

In step, S203 the vision module 22 determines vision guidance data (e.g., vision-derived location data or a vision error signal) for one or more of the evaluation time intervals or corresponding times. For example, the vision module 22 may collect images and process the collected images to determine vision-derived location data. In one example, the vision-derived location data comprises vision-derived position data of a vehicle, which is obtained by reference to one or more visual reference marker or features with corresponding known locations to determine coordinates of a vehicle. The coordinates of a vehicle may be determined in accordance with a global coordinate system or a local coordinate system.

The vision guidance error signal or the vision error signal (e.g., $y_{vision}$) represents (1) a difference between the actual vehicular location and a desired vehicular location for a desired time, (2) a difference between the actual vehicular heading and a desired vehicular heading for a desired time or position, (3) or another expression of error associated with the vision-derived location data or vision guidance data.

In step S204, a vision quality estimator 20 estimates vision quality data during the evaluation time interval. The vision quality estimator 20 may comprise a luminance or photo-detector and a time or clock for time-stamping luminance measurements to determine a quality level based on the ambient lighting conditions. The vision quality estimator 20 may also comprise a measure of confidence or reliability in processing the images to obtain desired features. The confidence or reliability in processing the images may depend upon any of the following factors, among others: technical specification (e.g., resolution) of the vision module 22, reliability of recognizing an object (e.g., landmark in an image), reliability of estimating a location of the recognized object or a point thereon, reliability of converting image coordinates or local coordinates to a global coordinates or vision-derived location data that is spatially and temporally consistent with the location data from the location-determining receiver 28.

Step S204 may be carried out by various techniques which may be applied alternately or cumulatively. Under a first technique, the vision quality estimator 20 may estimate a confidence or reliability in the accuracy of vision-derived location data. Under a second technique, the vision quality estimator 20 first estimates the confidence level, reliability level or another quality level in the accuracy of the vision-derived location data; and, second, the vision quality estimator 20 converts the quality level into a corresponding linguistic value.

In step S206, an adjuster 110 or vehicle controller 25 adjusts the preliminary guidance data (e.g. preliminary location data) to a revised guidance data (e.g., revised location data) based on the vision guidance data (e.g., vision-derived location data) such that the revised guidance data (e.g., revised location data) is registered with or generally coextensive with the vision guidance data (e.g., vision-derived location data), if the vision quality data exceeds the minimum threshold level. For example, the adjuster 110 or vehicle controller 25 may adjust the preliminary location data for any time slot or evaluation time window, where the vision quality data exceeds a minimum threshold level and if any disparity or difference between the vision guidance data and preliminary guidance data is material. Registered with or generally coextensive with means that the vision-derived location data and the preliminary location data for the same time interval are generally coextensive or differ by a maximum tolerance (e.g., which may be expressed as a distance, a vector, or separation in seconds (or other units) between geographic coordinates). For example, the maximum tolerance may be set to be a particular distance (e.g., 2.54 centimeters) within a range from one centimeter to 10 centimeters.

In one embodiment, the adjuster 110 transmits or makes available an error control signal to the vehicular controller 25 based on the preliminary location data or revised location data. The revised location data, or the error control signal derived therefrom, may be updated on a time-slot-by-time-slot basis (e.g., during an application time window). Each time slot may be commensurate in scope to the evaluation time interval.

The adjuster 206 may enhance the reliability and accuracy of the revised location data or position information that is provided for navigation or control of the vehicle by using the vision-derived location data of verified quality as a quality benchmark against the preliminary location data. Although the preliminary location data and vision-derived quality data are collected during an evaluation time interval; the adjustment of step S206 to the revised location data may be applied during an application time interval that lags the evaluation time interval or that is substantially coextensive with the evaluation time interval. Regardless of how the evaluation time interval and the application time interval are defined in this example, in other examples the adjuster 110 may provide predictive control data, feed-forward control data, or feedback control data to the vehicle controller 25.

Figure 3:
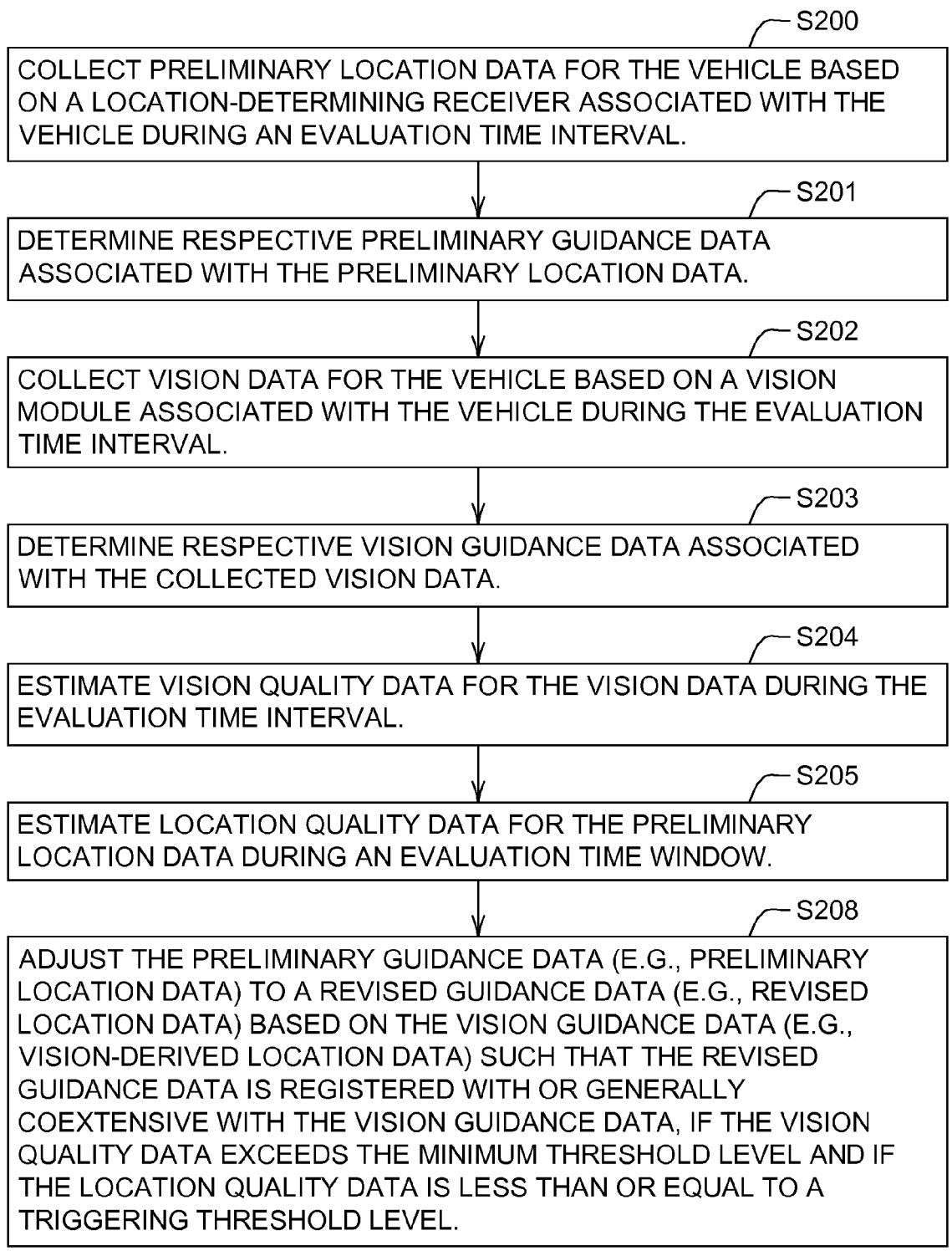
FIG. 3 is a flow chart of another method for guiding a vehicle based on preliminary guidance data (e.g., preliminary location data) and vision guidance data (e.g., vision-derived location data) in accordance with the invention.

The method of FIG. 3 is similar to the method of FIG. 2, except the method of FIG. 3 includes additional step S205 and replaces step S206 with step S208. Like reference numbers indicate like procedures or steps.

In step S205, a location quality estimator 24 estimates location quality data for the location data or guidance data during an evaluation time window. Step S205 may be carried out by various techniques which may be applied alternately or cumulatively. Under a first technique, the location quality estimator 24 may estimate or measure signal quality, an error rate (e.g., bit error rate or frame error rate), a signal strength level (e.g., in dBm), or other quality levels. Under a second technique, the location quality estimator 24 estimates or measures signal quality, an error rate (e.g., bit error rate or frame error rate), a signal strength level (e.g., in dBm), or other quality levels; second, the location quality estimator 24 classifies the signal quality data into ranges, linguistic descriptions, linguistic values, or otherwise.

In step S208, an adjuster 110 or vehicle controller 25 adjusts the preliminary guidance data (e.g., preliminary location data) to a revised guidance data (e.g., revised location data) based on the vision guidance data (e.g., vision-derived location data) such that the revised guidance data is registered with or generally coextensive with the vision guidance data, if the vision quality data exceeds the minimum threshold level and if the location quality data or guidance data is less than or equal to a triggering threshold level. For example, the adjuster 110 or vehicle controller 25 may adjust the preliminary location data for any time slot or evaluation time window, (a) where the vision quality data exceeds a minimum threshold level and (b) where the location quality data is less than or equal to a triggering threshold level or where any disparity or difference between the vision guidance data and preliminary guidance data is material. For example, the triggering threshold level may be where the reliability or accuracy of the preliminary location data is less than desired because of the lack of availability of satellites, or low received signal quality (e.g., low signal strength) of satellite signals or ancillary transmissions (e.g., terrestrial references) used to determine precision preliminary location data. The adjuster 206 may enhance the reliability and accuracy of the revised location data or position information that is provided for navigation or control of the vehicle by using the vision guidance data (e.g., vision-derived location data) of verified quality as a quality benchmark against the preliminary guidance data (e.g., preliminary location data). The method of FIG. 3 makes the adjustment to the revised location data in a more selective manner than FIG. 2, by imposing the additional condition of location data quality falling below a standard (e.g., triggering threshold level).

Figure 4:
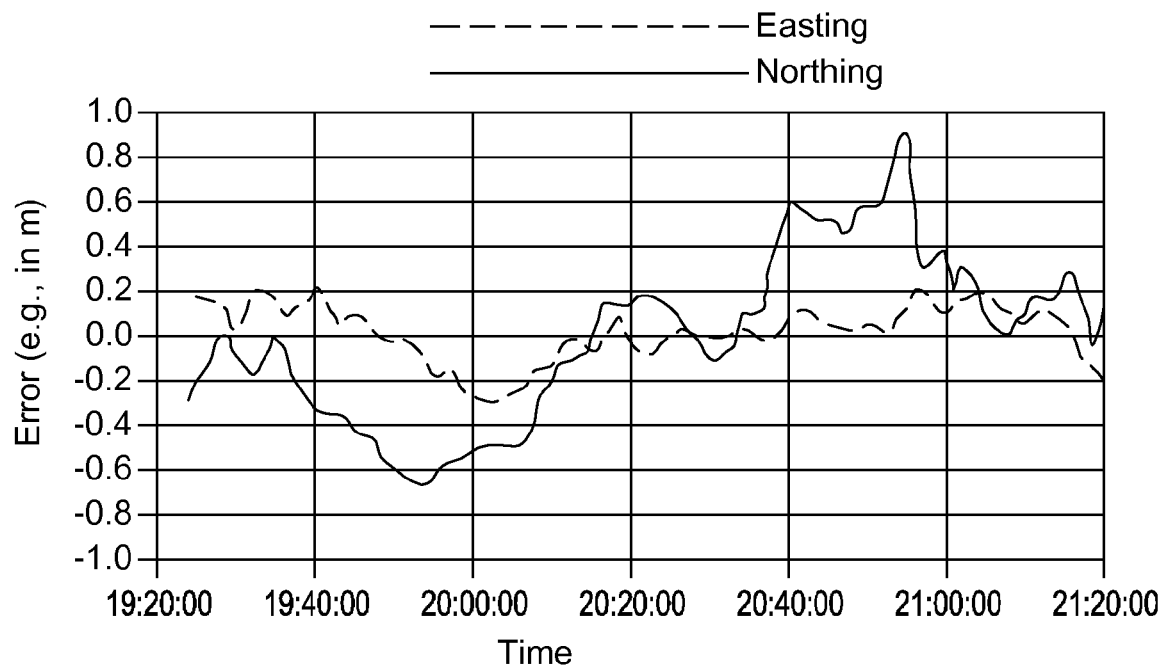
FIG. 4 is a chart that illustrates static positioning error of location data, such as a guidance signal derived from differential Global Positioning System (GPS).

FIG. 4 is a chart that illustrates static positioning error of location data, such as a differential GPS signal. The vertical axis shows error in distance (e.g., meters), whereas the horizontal axis shows time (e.g. seconds).

Figure 5:
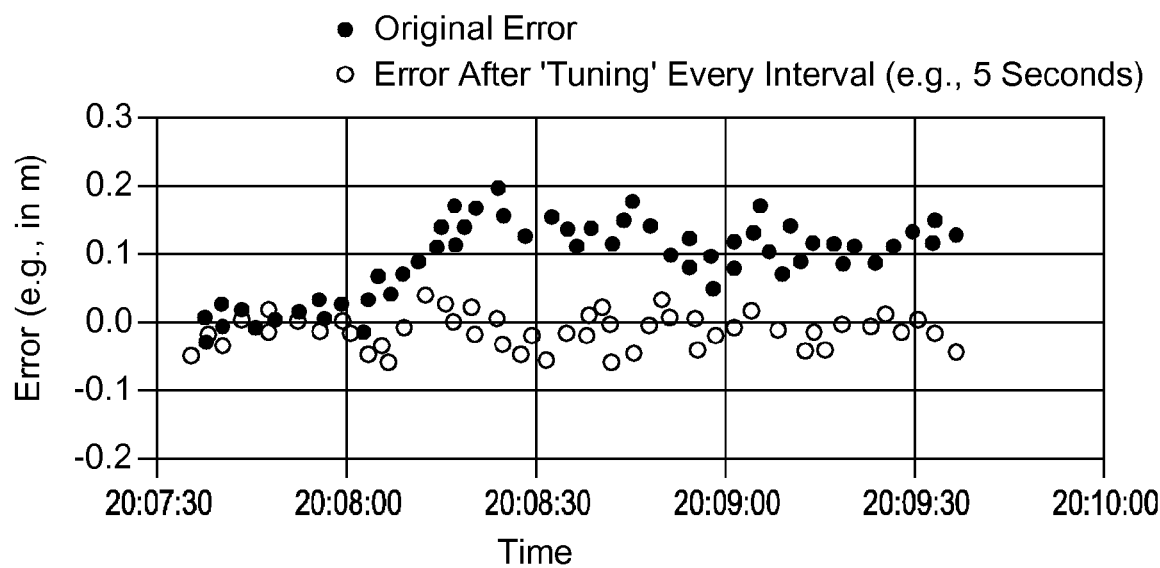
FIG. 5 is a chart that illustrates positioning error of location data, such as a guidance signal derived from differential Global Positioning System (GPS) signal after "tuning" by another sensor, such as a vision module in accordance with the invention.

FIG. 5 is a chart that illustrates dynamic positioning error of location data, such as a differential GPS signal (e.g., location data) after "tuning" at a desired update frequency or rate. The vertical axis shows error in distance (e.g., meters), whereas the horizontal axis shows time (e.g. seconds). FIG. 5 shows the original error without "tuning" as solid circular points and error after "tuning" as circles. The tuning achieved by using the vision-derived location data to adjust the location data at regular intervals (e.g., at 5 second intervals or 0.2 Hz as illustrated in FIG. 5).

Figure 6:
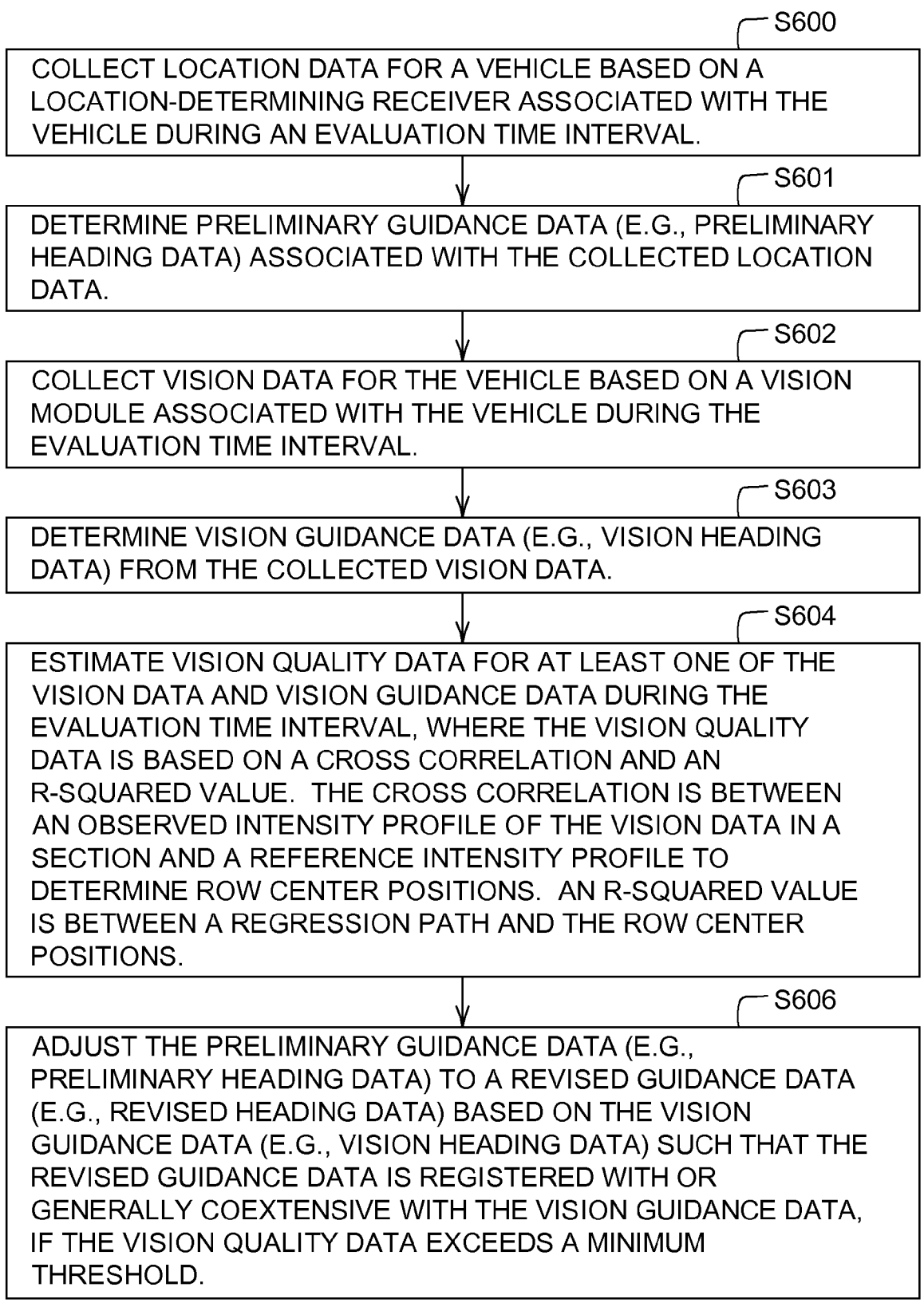
FIG. 6 is a flow chart of one embodiment of a method for guiding a vehicle based on vision guidance data from vision data (e.g., monocular vision data).

FIG. 6 illustrates a method for adjusting the position or heading a vehicle based on a vision data. The method of FIG. 6 begins in step S600.

In step S600, a location-determining receiver 28 collects location data (e.g., heading data) for the vehicle during an evaluation time interval.

In step S601, the location module 26 or the location-determining receiver 28 determines the guidance data (e.g., heading data) from the collected location data. For example, the location module 26 may determine guidance data from two sets of coordinates that are collected at a first time and a second time during the evaluation time interval. Guidance data comprises one or more of the following items derived from collected location data: heading data, heading error data, off-track data, off-track error data, curvature data, curvature error data, and a location-error signal.

The heading data refers to the direction (e.g., angular orientation) of a vehicle (e.g., a longitudinal axis of the vehicle) relative to a reference direction (e.g., magnetic North). The heading error is a difference between actual vehicle heading and target vehicle heading. The heading error may be associated with errors (e.g., measurement error) in at least one of the vision module 22 and the location module 26.

Off-track data indicates a displacement of the vehicle path position from a desired vehicle path position. An off-track error indicates or is representative of the difference between the actual position of the vehicle (e.g., in GPS coordinates) and the desired position of the vehicle (e.g., in GPS coordinates).

The curvature is the change of the heading on the desired path. For example, curvature is the rate of change of the tangent angle to the vehicle path between any two reference points (e.g., adjacent points) along the path.

In step S602, the vision module 22 or image collection system 31 collects vision data or image data for the vehicle during the evaluation time interval. The collected vision data may comprise monocular vision data or stereo vision data, for example.

In step S603, the vision module 22 or image processing system 33 determines vision guidance data (e.g., vision heading data) from the collected vision data.

In step S604, the vision quality estimator (20, 120 or 220) estimates vision quality data for at least one of the vision data and the vision guidance data during the evaluation time interval, where the vision quality data is based on a cross correlation and an r-squared value. The cross correction is between an observed intensity profile of the vision data in a section and a reference intensity profile to determine row center positions. An r-squared value is between a regression path and the row center positions. The vision quality estimate of step S604 is well suited for application to monocular vision data (e.g., collected in step S602).

In step S606, an adjuster 110 or controller adjusts the preliminary guidance data (e.g., preliminary heading data) to revised guidance data (e.g., revised heading data) based on the vision guidance data (e.g., vision heading data) such that the revised guidance data (e.g., revised heading data) is registered with or generally coextensive with the vision guidance data, if the vision quality data exceeds a minimum threshold. For example, the adjuster 110 or controller adjusts the preliminary guidance data to a revised guidance data based on the vision guidance data, if the vision quality data exceeds a minimum threshold and if any disparity or difference between the vision guidance data and preliminary guidance data is material.

Figure 7:
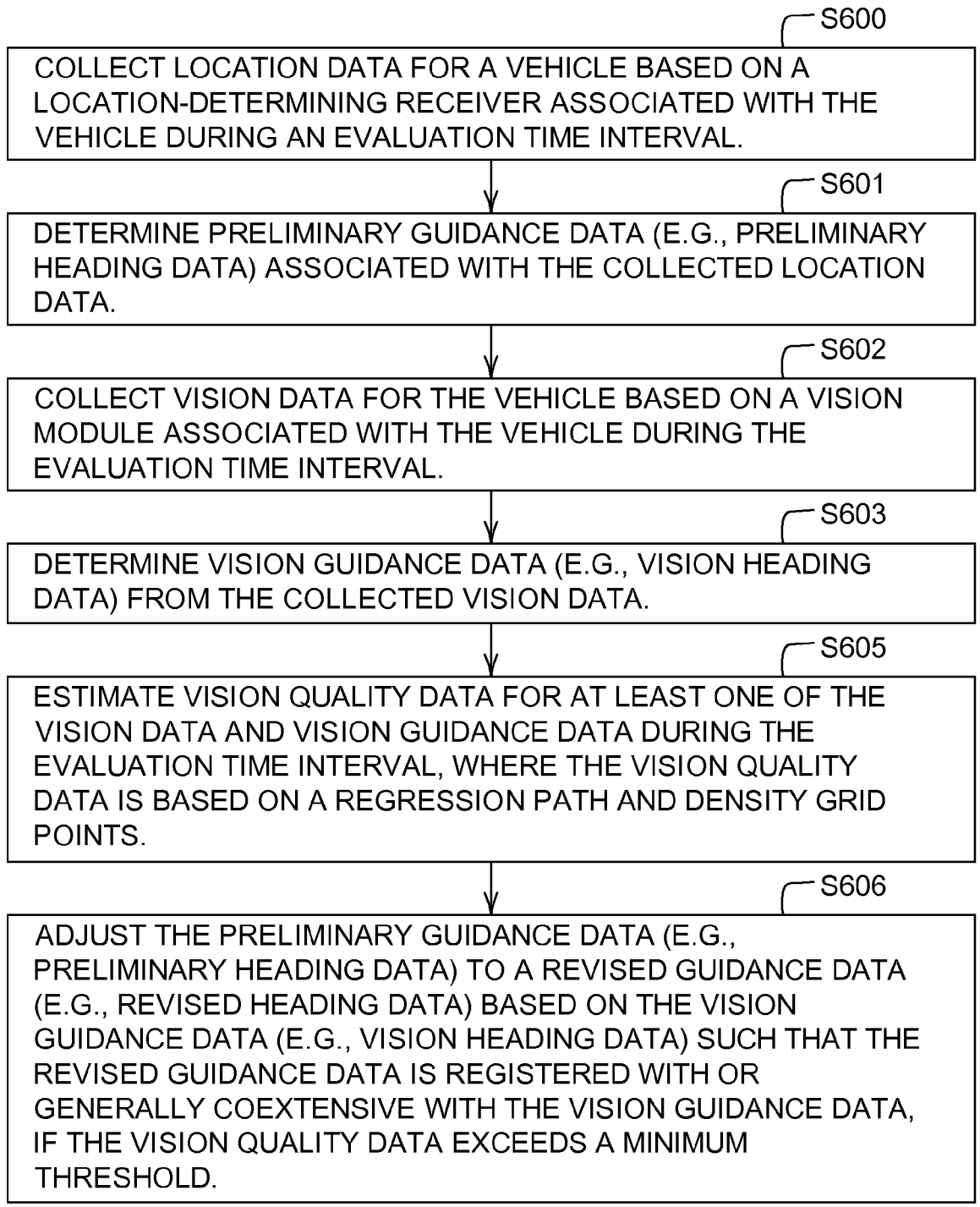
FIG. 7 is a flow chart of another embodiment of a method for guiding a vehicle based on vision guidance data.

The method of FIG. 7 is similar to the method of FIG. 6, except step S605 replaces step S604. Like reference numbers in FIG. 6 and FIG. 7 indicate like steps or procedures.

In step S605, the vision quality estimator (20, 120, or 220) estimates vision quality data for at least one of the vision data and the vision guidance data during the evaluation time interval, where the vision quality data is based on a regression path and density grid points. The vision quality estimate of step S605 is well suited for application to stereo vision data (e.g., collected in step S602).

Figure 8A:
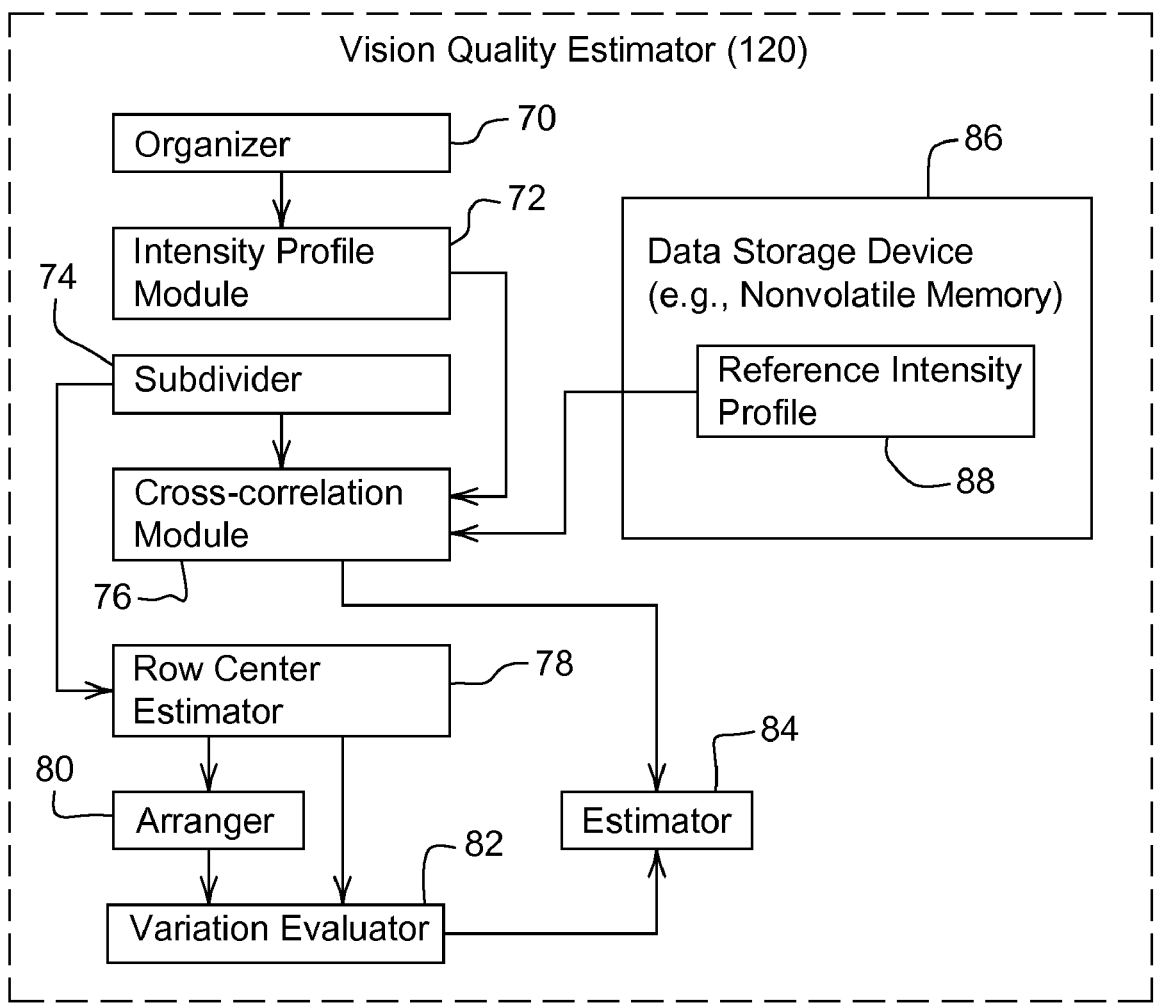
FIG. 8A is a block diagram of a various components or logical constituents of a vision quality estimator.

FIG. 8A is a block diagram of an illustrative configuration of a vision quality estimator 120. The interconnections between the components (e.g., 70, 72, 74, 76, 78, 80, 82, 84 and 86) of FIG. 8A may represent logical data paths, physical data paths, or both.

The organizer 70 communicates with an intensity profile module 72. The cross-correlation module 76 may receive input data from the subdivider 74, the data storage device 86, and the intensity profile module 72. The data storage device 86 stores a reference intensity profile 88 for retrieval or access by the cross correlation module 76. The cross correlation module 76 outputs data to the estimator 84. The subdivider 74 communicates with the row center estimator 78. The row center estimator 78 and the arranger 80 provide input data for the variation evaluator 82. In turn, the variation evaluator 82 outputs data to the estimator 84.

The vision module 22 provides one or more of the following to the vision quality estimator 120: vision data, image data, and vision guidance data. As used herein, image data and vision data shall be regarded as synonymous terms. The vision module 22 may determine vision guidance data from collected vision or image data.

In FIG. 8A, the vision quality estimator 120 is arranged to estimate vision quality data for at least one of the vision data (or image data) and the vision guidance data during the evaluation time interval. The vision quality estimator 120 may determine vision quality data based on cross correlations and an r-squared value. Each cross correlation is determined between an observed intensity profile of the image data in a section and a reference intensity profile to determine row center positions. An r-squared value is determined between the regression path and the row center positions.

An organizer 70 organizes a collected image into crop pixels and non-crop pixels. An intensity profile module 72 determines an intensity profile based on pixel intensity values of the crop pixels. A data storage device 86 stores a reference intensity profile associated with a group of crop rows or a single crop row. A subdivider 74 subdivides the collected image into multiple sections or overlapping windows.

In general, the cross-correlation module 76 determines a cross correlation between the intensity profile (provided by the intensity profile module 72) and a reference intensity profile 88 for each one of the sections. In one embodiment, the cross correlation module 76 is arranged to determine a normalized cross correlation as the cross correlation. The normalized cross correlation is based on a mean cross correlation for a group of sections of the image data. Each section is associated with a corresponding row center position, which is determined by a row center estimator 78.

The subdivider 74 communicates or makes available sections or overlapping windows to the row center estimator 78. The row center estimator 78 is configured to estimate the row center positions associated with corresponding sections or subdivisions of the image data. The arranger 80 is configured to determine the regression path coinciding with the row center positions. For example, the arranger 80 arranges estimated row center positions into a regression path (e.g., regression line) defining a representation of a position and orientation of a crop row.

A variation evaluator 82 determines an r-squared value between the regression path (e.g., regression line) and the row center positions. An estimator 84 determines vision quality data based on the determined cross correlations and the r-squared value for application to a vehicle controller 25 or adjuster 110 for steering of a vehicle. The guidance data comprises at least one of heading data, off-track data, and curvature data, for example.

Figure 8B:
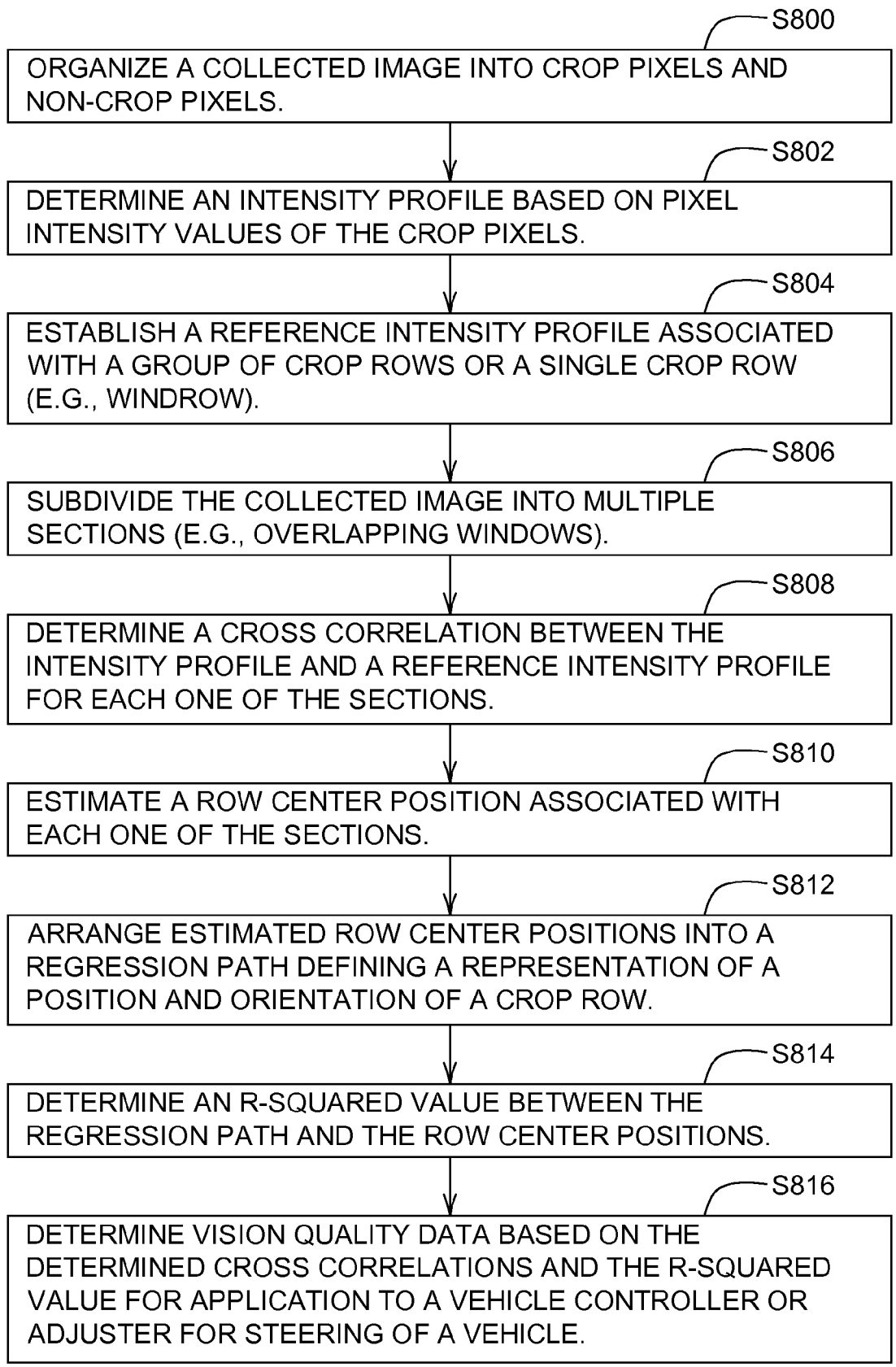
FIG. 8B is a flow chart of one embodiment of method for determining vision quality data for image data or vision data.

FIG. 8B is a method for estimating the quality of vision data or vision guidance data. The method of FIG. 8B begins in step S800.

Figure 9:
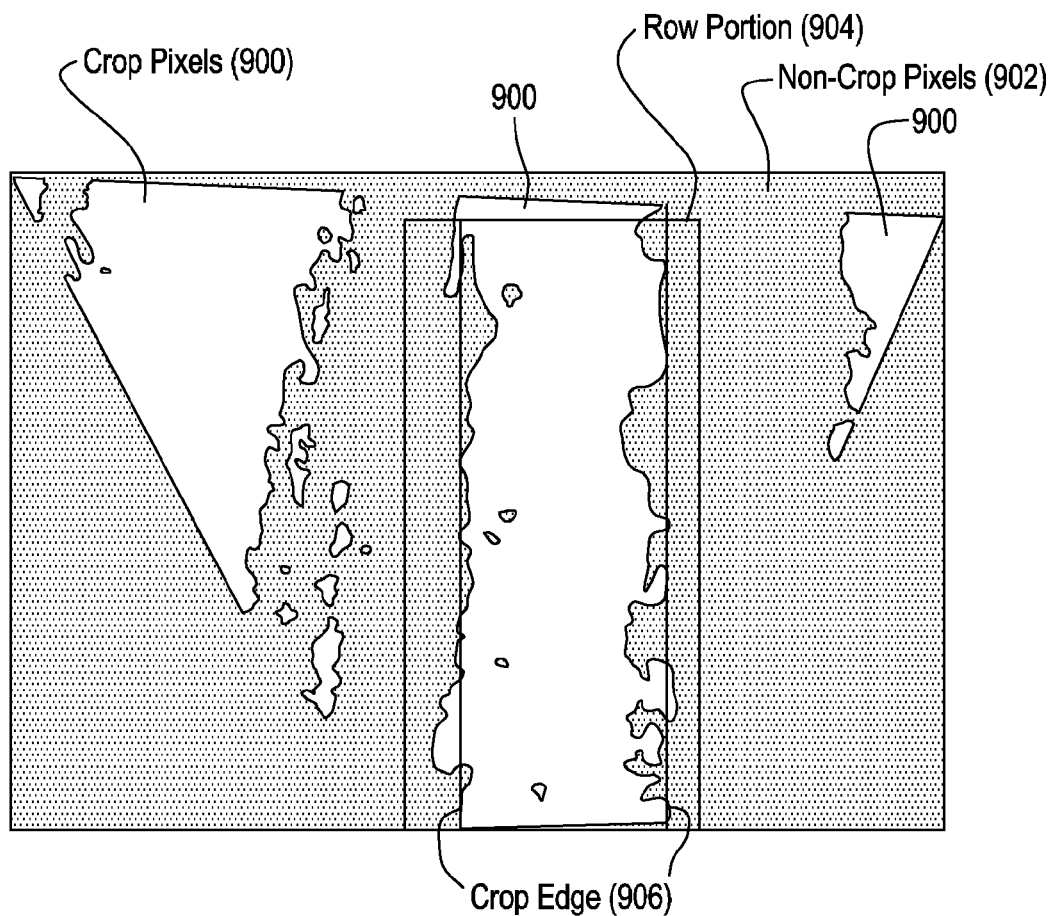
FIG. 9 is an illustrative image of a row crop after organization or segmentation into crop pixels and non-crop pixels.

In step S800, the vision module 22 or image processing system 33 organizes a collected image into crop pixels and non-crop pixels. The vision module 22 or image processing system 33 may use color discrimination to organize or segment the collected image into crop pixels and non-crop pixels. Crop pixels may be defined by reference vegetation colors (e.g., green hues), or the like. FIG. 9 provides an illustration of the organization of collected image into crop pixels and non-crop pixels, consistent with step S800.

In step S802, the vision module 22 or the image processing system 33 determines an observed intensity profile based on observed pixel intensity values of the crop pixels. For example, the vision module 22 or the image processing system 33 determines an observed intensity profile for a boundary between crop pixels and non-crop pixels. In one embodiment, the observed intensity profile may indicate one or more crop edges or a generally linear boundary between the crop pixels and non-crop pixels.

The vision module 22 or the image processing system 33 qualifies pixels for membership in the observed intensity profile by assuring that the pixels within the observed pixel intensity profile meet a pixel intensity criteria or requirement (e.g., minimum pixel intensity for a vegetation color or light frequency range corresponding thereto). Pixel intensity may be defined as a brightness of a pixel in monochrome color space (e.g., for particular green color, shade or hue associated with vegetation), or the brightness of a red, green, and blue component in RGB color space, for example. Crop pixel intensity is generally proportional to the irradiance or electromagnetic radiation (e.g., of one or more frequency bands of visible light) that is reflected by or incident on a crop portion (e.g., a portion of a crop surface area) in a collected image. The pixel intensity values for crop pixels may meet or exceed a minimum threshold intensity for a vegetation canopy of a crop row, including a boundary of a crop row, where crop pixels are adjacent to non-crop pixels. Similarly, the pixel intensity values for crop pixels may meet or exceed a minimum threshold intensity for harvested crop material lying on the ground or a windrow, including a boundary of the windrow.

Figure 11:
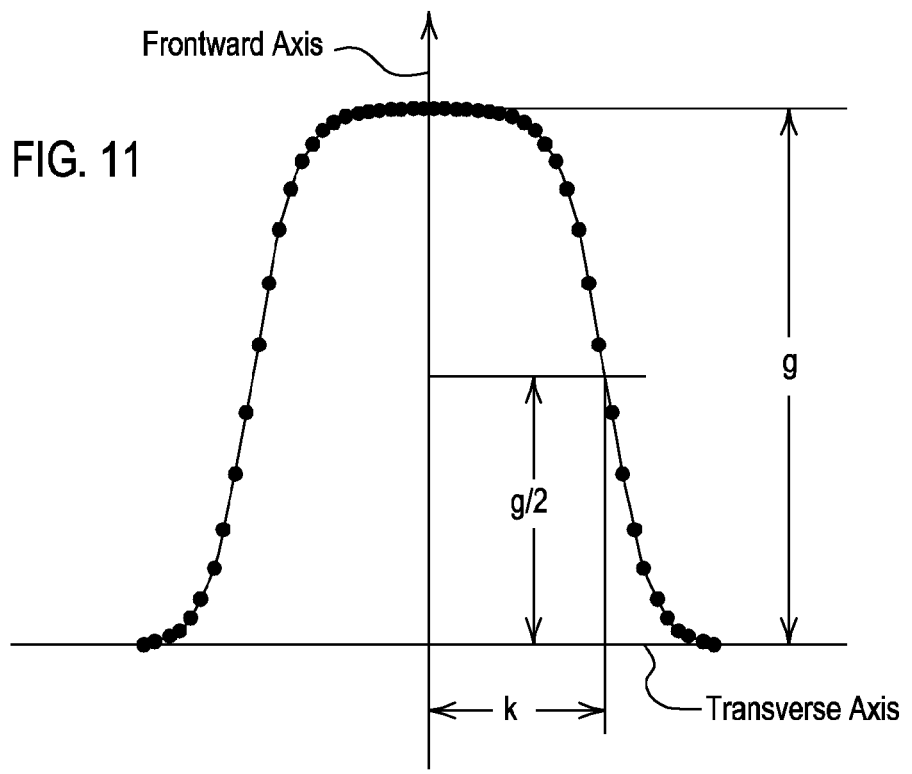
FIG. 11 is an illustrative Fermi function for application as a template or reference intensity profile for a windrow.
Figure 12:
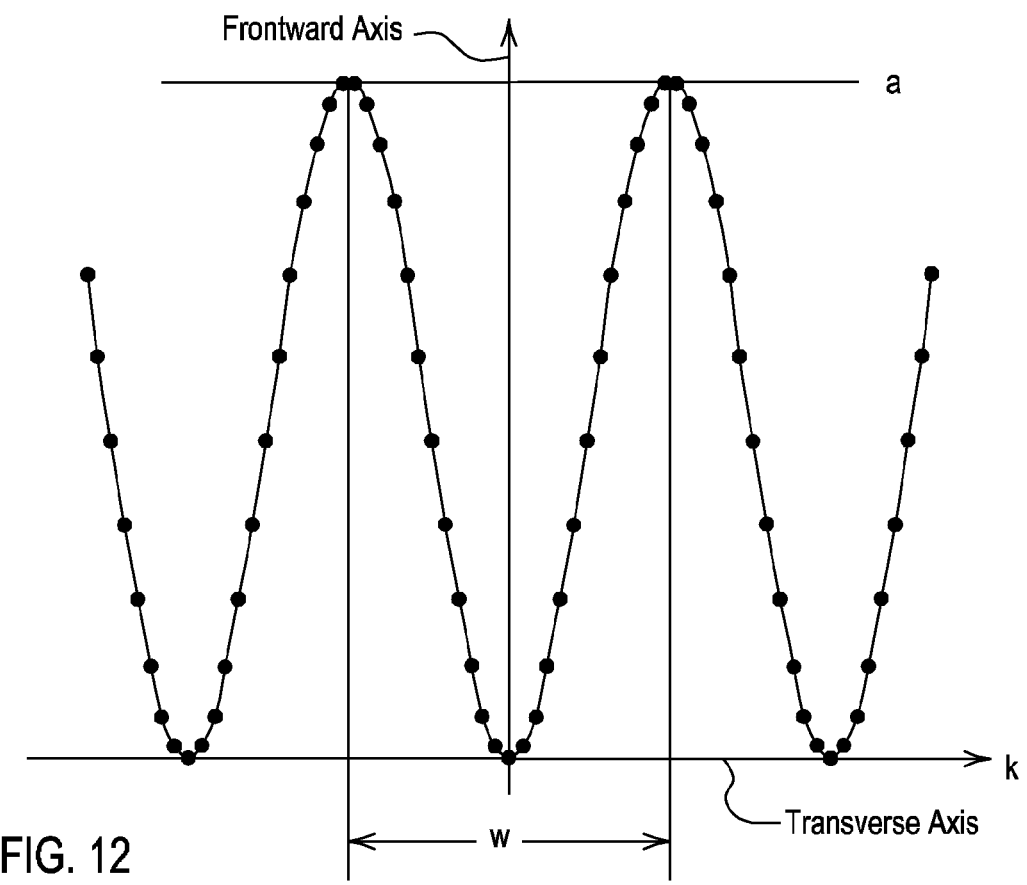
FIG. 12 is an illustrative sinusoidal function for application as a template or a reference intensity profile for row crops.

In step S804, the vision module 22 or image processing system 33 establishes a reference intensity profile associated with a group of crop rows or a single crop row (e.g. windrow). The reference intensity profile comprises a template which may vary based on whether the plant material is arranged in a group of rows or as one or more windrows. FIG. 11 illustrates a reference intensity profile associated with a windrow, whereas FIG. 12 illustrates a reference intensity profile associated with multiple parallel plant rows.

Figure 14:
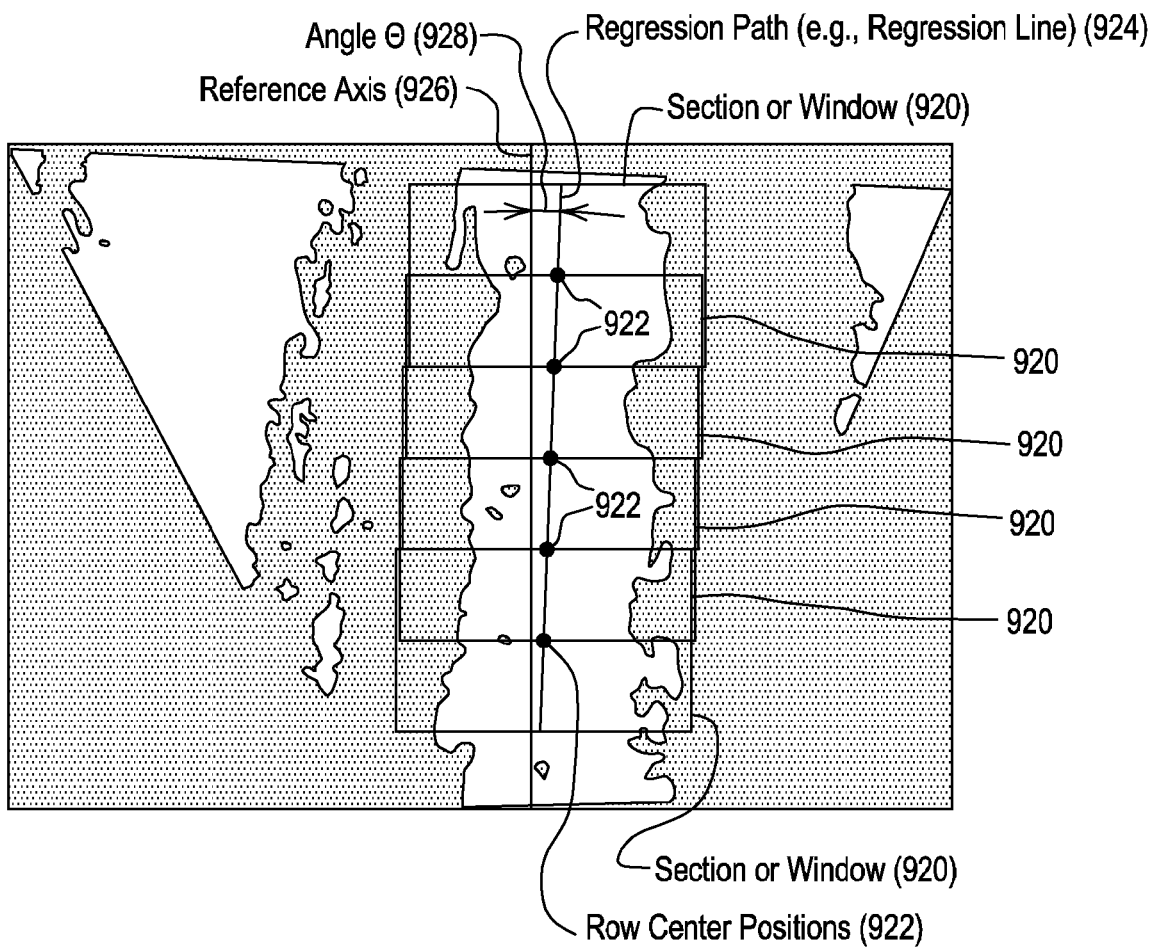
FIG. 14 shows a regression path (e.g., regression line) associated with an approximate centerline of crop row and multiple sections or windows associated with the regression path.

In step S806, the vision module 22 or the vision quality estimator (20, 120, or 220) subdivides the collected image into multiple sections (e.g., overlapping windows). FIG. 14 provides a graphical illustration of the subdivision of sections consistent with step S806.

Figure 13:
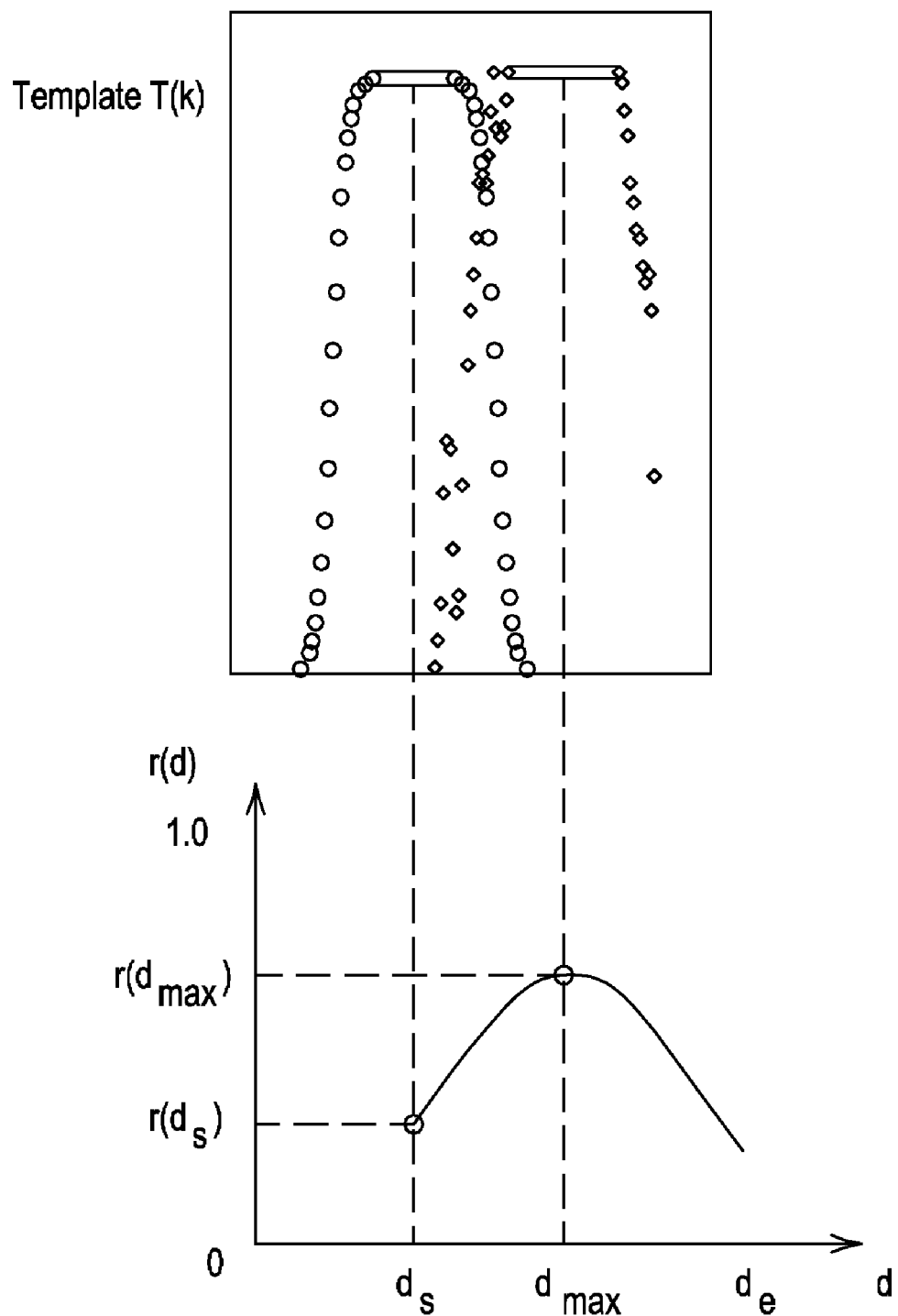
FIG. 13 is a graphical representation of the determination of cross-correlation between the reference intensity profile and an observed intensity profile.

In step S808, the vision quality estimator (20, 120, 220) determines a cross correlation between the intensity profile and a reference intensity profile for each one of the sections. FIG. 13 provides a graphical illustration of determining cross correlation, consistent with step S808.

In step S810, the vision quality estimator estimates a row center position associated with each one of the sections. FIG. 14 shows row center positions associated with each section, consistent with step S808.

In step S812, the vision quality estimator (20, 120 or 220) arranges estimated row center positions into a regression path defining a representation of position and orientation of a crop row. A regression path may comprise a generally linear regression path that is defined based on the positions and distribution of row center positions. For example, the vision quality estimator (20, 120, or 220) may establish a regression path as a linear equation based on a least squares method, a weighted least squares method, polynomial fitting, multiple regression, a statistical regression technique, a mathematical regression technique, or another technique that generally minimizes the distance or error between the regression path and the row center positions.

In step S814, the vision quality estimator (20, 120 or 220) determines an r-squared value between the regression path and the row center positions.

In step S816, the vision quality estimator (20, 120 or 220) determines vision quality data based on the determined cross correlations and the r-squared value for application to a vehicle controller or adjuster for steering of a vehicle. An r-squared value may be used to determine the degree that observed vision data or observed vision guidance data (e.g., observed crop row position or windrow position) conforms to a predictive model (e.g., regression path for crop row position) associated with vision data or vision guidance data.

Step S816 may be carried out by various techniques that may be applied alternately or cumulatively. Under a first technique, the vision quality estimator (20, 120 or 220) determines the r-squared value based on the following equation: r squared=$1-v_{model}/v_{total}$, where $v_{model}$ is the variability or error indicator of center points associated with different sections with respect to the regression path (e.g., generally linear regression path), and where $v_{total}$ is the variability or error indicator of the crop row about its mean center position. An r-squared value may be normalized within a range from one to zero, such that an r-squared value approaching one is generally considered better than an r-squared value approaching zero.

Under a second technique, the confidence level, C, or vision quality data for the vision processing depends on two factors: the r-squared value of the regression line and the normalized cross-correlation from template matching.

$$C = 255 * R_{reg}^2 * r_{cross\_norm}$$

$$r_{cross\_norm} = \begin{cases} \left(\dfrac{\bar{r}_{cross}}{r_{cross\_ref}} - r_0\right) \Big/ (1-r_0) & r_{cross\_ref} * r_0 \leq \bar{r}_{cross} \leq r_{cross\_ref} \\ 1 & \bar{r}_{cross} \geq r_{cross\_ref} \\ 0 & \bar{r}_{cross} \leq r_{cross\_ref} * r_0 \end{cases}$$

where $\bar{r}_{cross}$ is the mean or average cross-correlation from a group of sections, $r_{cross\_ref}$ is the reference cross-correlation, and $r_0$ is a minimum cross-correlation. The reference correlation is typically obtained from an initial reference image, whereas the minimum cross correlation is typically determined by the user. In order to obtain high confidence level, two conditions have to be met: first, the crop centers in the processing sections (e.g., windows) must form a generally straight line or conform to a known as-planted contour, and second, the intensity profiles in the processing sections must conform to the selected reference intensity profile (e.g., template, similar to those of FIG. 11 or FIG. 12). The template or reference profile may be adapted to changes in crops or conditions. Because the width of crop row may change from time, the template may be updated to adapt the crop row. In one implementation; the historic average or mean of the crop row spacing may be used.

FIG. 9 is an illustrative image of several row crops after organization or segmentation into crop pixels 900 and non-crop pixels 902. FIG. 9 is a representative image of the result of execution of step S800 of FIG. 8B, for example. The collected image collected by the image collection system 31 or the vision module 22 is first segmented into crop pixels 900 and non-crop pixels 902, and then rectified to remove distortion. The white or light pixels represent crop pixels 900, whereas the dotted regions represent non-crop pixels 902. As shown, one crop row is organized into a row portion 904 that falls between a minimum depth and a maximum depth from the image collection system 31 or vision module 22. Each side of the crop row is associated with crop edges 906.

Figure 10:
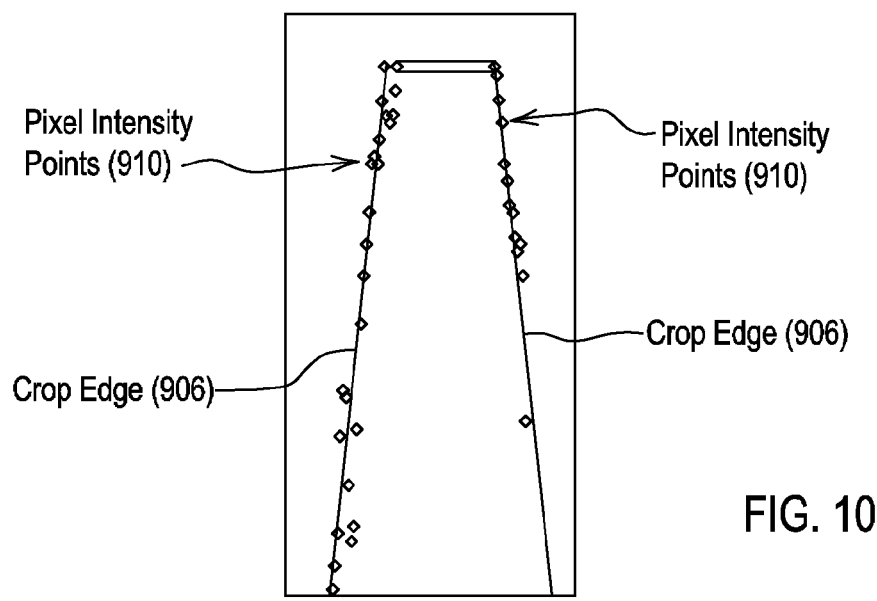
FIG. 10 is an illustrative intensity profile derived from the crop pixels of FIG. 9.

FIG. 10 is an illustrative observed intensity profile derived from the crop pixels 900 of FIG. 9. In one example, each pixel intensity point 910 represents the sum of pixel intensity of crop pixels on a vertical line segment within a region of interest (e.g., near or at a crop edge 906). In another example, each pixel intensity point 910 represents the intensity of a single corresponding crop pixel within a region of interest (e.g., near or a crop edge). In yet another example, each pixel intensity point 910 represents a mean, average or mode pixel intensity of a cluster of crop pixels associated with a region of interest (e.g., near or at a crop edge). The observed intensity profile (e.g., of FIG. 10) is compared to a reference intensity profile, called a template (e.g., FIG. 11 or FIG. 12), to determine the offset of the crop row relative to a reference row position. The reference row position may be established when the crop, a seed, or precursor was planted, for instance.

FIG. 11 is an illustrative Fermi function for application as a template or reference intensity profile for a windrow. The horizontal axis may be referred to as the transverse axis, whereas the vertical axis may be referred to as the frontward axis. The traverse axis is generally perpendicular to the frontward axis. The frontward axis may be tilted at a known angle to the ground or horizon. The transverse axis and the frontward axis are from the perspective of the image collection system 31 facing a crop row, where a longitudinal dimension of the crop row is generally parallel to the direction of travel of the vehicle.

The reference intensity profile may vary depending on a particular application, such as whether the field contains crop rows, windrows or a cut vegetation (e.g., hay) lying on the ground. For a windrow, a Fermi function or another step or impulse function may be used to represent an ideal windrow intensity profile as shown in FIG. 11. For the Fermi function of FIG. 11, g represents the peak amplitude, g/2 represents one half of the peak amplitude and the value k represents the width of the windrow at one-half of the peak amplitude. In one embodiment, the peak amplitude of FIG. 11 may be associated with the maximum evaluated depth of the windrow from the image collection system 31.

FIG. 12 is an illustrative sinusoidal function for application as a template or a reference intensity profile for row crops. The horizontal axis may be referred to as the transverse axis, whereas the vertical axis may be referred to as the frontward axis. The traverse axis is generally perpendicular to the frontward axis. The frontward axis may be tilted at a known angle to the ground or horizon. The transverse axis and the frontward axis are from the perspective of the image collection system 31 facing a crop row, where a longitudinal dimension of the crop row is generally parallel to the direction of travel of the vehicle.

The peak amplitude of the sinusoidal function is indicated by a, whereas w represents the period of one wavelength. In one embodiment, the peak amplitude of FIG. 12 may be associated with the maximum evaluated depth of the crop row from the image collection system 31, whereas the period, w, may be proportional to the crop row width or spacing between adjacent crop rows.

Although a sinusoidal function is used for the reference intensity profile of FIG. 12, in an alternative embodiment, a pulse train, a square wave, a series of impulse functions, or any other suitable function may be used for the reference intensity profile to model the vegetation crop rows. Further, the reference intensity profile may vary throughout the growing season as a crop matures, for instance.

FIG. 13 is a graphical representation of the determination of cross-correlation between the reference intensity profile (e.g., Template T(k)) and an observed intensity profile (e.g., Intensity profile I(k)). A cross-correlation function, r(d), between the observed intensity profile (e.g., FIG. 10) and the reference intensity profile (e.g., FIG. 11) is calculated as follows:

$$r(d) = \frac{\sum_{k=0}^{N} \{(I(k) - \overline{I}) * (T(k+d) - \overline{T})\}}{\sqrt{(I(k) - \overline{I})^2} * \sqrt{(T(k+d) - \overline{T})^2}}$$

where r(d) is the general image cross-correlation function between the observed intensity profile I(k) and the reference intensity profile T(k+d), d defines the location of the reference intensity profile, $\overline{I}$ is the mean intensity of the observed intensity profile, $\overline{T}$ is the mean intensity of the reference intensity profile, and $r(d_{max})$, is the approximate center position of any crop row within the image. The delay $d_{max}$ that corresponds to the maximum correlation, $r(d_{max})$, is the center position of the crop row. In one embodiment, the cross correlation represents on factor or component of a confidence index or value of a vision quality data.

FIG. 14 shows a regression path 924 associated with an approximate centerline of a crop row and multiple sections 920 or windows associated with the regression path 924. The regression path 924 may comprise a generally linear regression line, or a straight or curved path that is defined by a linear or quadratic equation. Each section 920 is associated with a corresponding row center position 922. If the regression path 924 is generally linear, it may be defined with reference to an angle 928 (θ) relative to a reference axis 926 (e.g., magnetic North or another reference orientation).

In FIG. 14, the vision module 22, the image processing system 33, or the vision quality estimator (20, 120, or 220) divides the vision data (e.g., collected image or crop pixels) into multiple sections 920 (e.g., overlapping windows). The sections 920 are present in the region of interest (e.g., near a crop row). The vision module 22, the image processing system 33, or the vision quality estimator (20, 120, or 220) detects one or more crop rows by regression analysis.

In particular, for regression analysis, the vision quality estimator (20, 120, or 220) forms or estimates a regression path 924 (e.g., regression line segment) associated with the row center positions 922 or the centers of the crop row in each section 920 (e.g., overlapping window) to enhance the robustness of row detection. The row center positions 922 (e.g., points) are fitted into a regression path 924 (e.g., regression line segment). This regression path 924 represents both the position and orientation of the crop row.

The regression path 924 is compared to an initial heading or observed path of the vehicle to determine guidance data (e.g., to calculate the off-track, curvature and/or heading errors) for vehicle control. Although the vision quality estimator (20, 120 or 220) typically uses at least five sections per crop row, virtually any number of sections may be used to detect a crop row in each collected image. The vision quality estimator (20, 120 or 220) may determine an r-squared value, a confidence level, or another figure of merit for row center positions 922 associated with the regression path 924.

Figure 15A:
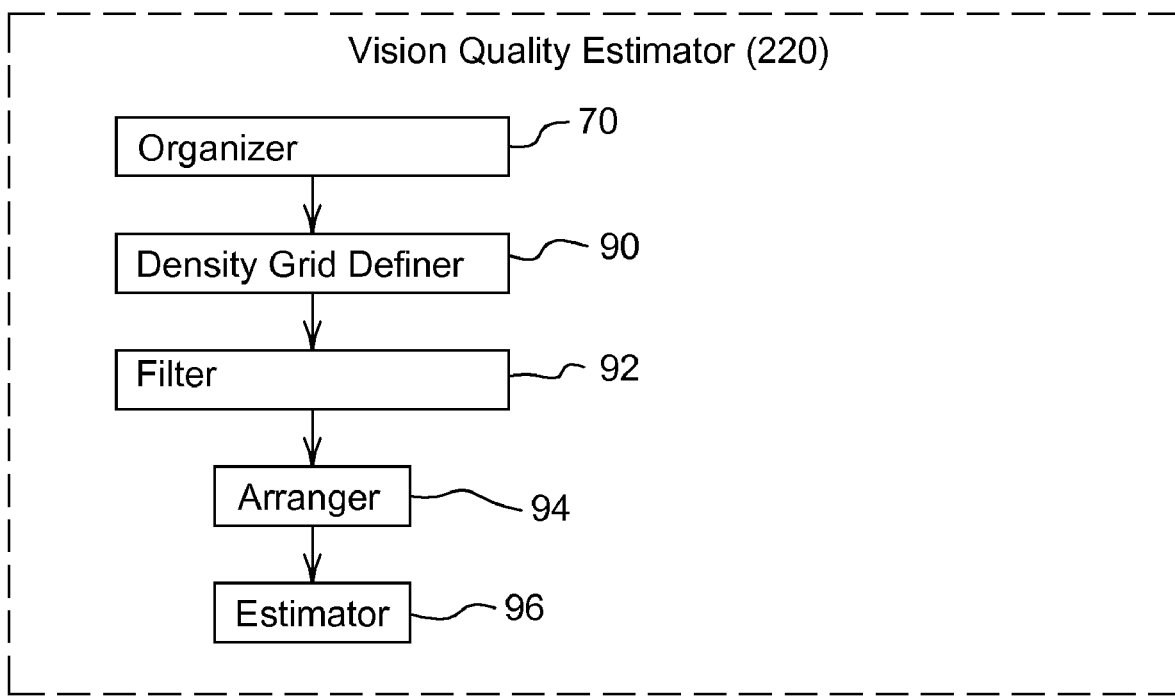
FIG. 15A is a block diagram of a various components or logical constituents of a vision quality estimator.

FIG. 15A is a block diagram of an illustrative configuration of a vision quality estimator 220. The interconnections between the components (70, 90, 92, 94 and 96) of FIG. 15A may represent logical data paths, physical data paths, or both.

The vision quality estimator 220 comprises an organizer 70 that communicates with a density grid definer 90. The density grid definer 90 outputs data to the filter 92, which filters the data for the arranger 94. In turn, the arranger 94 outputs data for the estimator 96.

For the vision quality estimator 220 of FIG. 15A, the vision module 22 may comprise a stereo vision imaging system for collecting image data (e.g., stereo image data) or vision data. The organizer 70 organizes a collected image data into crop pixels and non-crop pixels. The density grid definer 90 defines a density grid based on the number of crop pixels within each grid cell or a group of grid cells. For example, each grid cell may be defined as a matrix of X pixels by Y pixels, where X and Y are any positive whole numbers. Although the density of a grid cell may be defined as the ratio, fraction or percentage of crop pixels to total pixels within the density grid, other definitions of the density are possible. The filter 92 defines density grid points as those grid cells whose values are greater than a threshold or a minimum number of crop pixels per grid cell. The arranger 94 arranges a regression path based on the density grid points. The regression path represents a possible position and possible orientation (e.g., of a center) of a crop row or a windrow. An estimator 96 determines a confidence index as vision quality data based on the defined density grid points and the regression path. The confidence index is applied to a vehicle controller or an adjuster 110 for steering a vehicle. The vision quality estimator 220 may determine the confidence index in accordance with various techniques that may be applied alternately or cumulatively.

Under a first technique, the estimator 96 is arranged to determine a moment index of density grid points about the regression path and to determine a cluster index based on an inverse function of the standard deviation of the density grid points. The moment and cluster index are two measures to evaluate how close density grid points are distributed about the regression path (e.g., regression line). Under a second technique, the moment and cluster index are determined in accordance with the first technique, where the image data or vision data comprises stereo image data or filtered stereo image data. The moment and cluster index are well suited for evaluating stereo image data, particularly after the stereo image data has been filtered to exceed a minimum crop height (e.g., 1 meter). Under a third technique, the estimator 96 estimates or determines the confidence index as a product of the moment index and the cluster index. For example, confidence index is determined in accordance with the following equation:

where $C_M$ is the moment index given by $$C_M = 1 - \frac{M}{M_{max}},$$

M is moment of the density grid points around the regression line, and $M_{max}$ is maximum moment, $C_C$ is the cluster index given by $$C_C = 0.8 + \frac{0.2}{\sigma_d},$$

where $$\sigma_d = \frac{\sum_{i=1}^{n}(d_i - \bar{d})^2}{n-1},$$

$d_i$ is the orthogonal distance from a regression path (e.g., regression line) to a density grid point and $\bar{d}$ is the mean distance of density grid points to the regression path, and n is the total number of density grid points, and $\sigma d$ represents a variance of the density grid points. In an alternate embodiment, a deviation is derived from the square root of the variance; the deviation may be used as a substitute for the variance in the above equation.

Figure 15B:
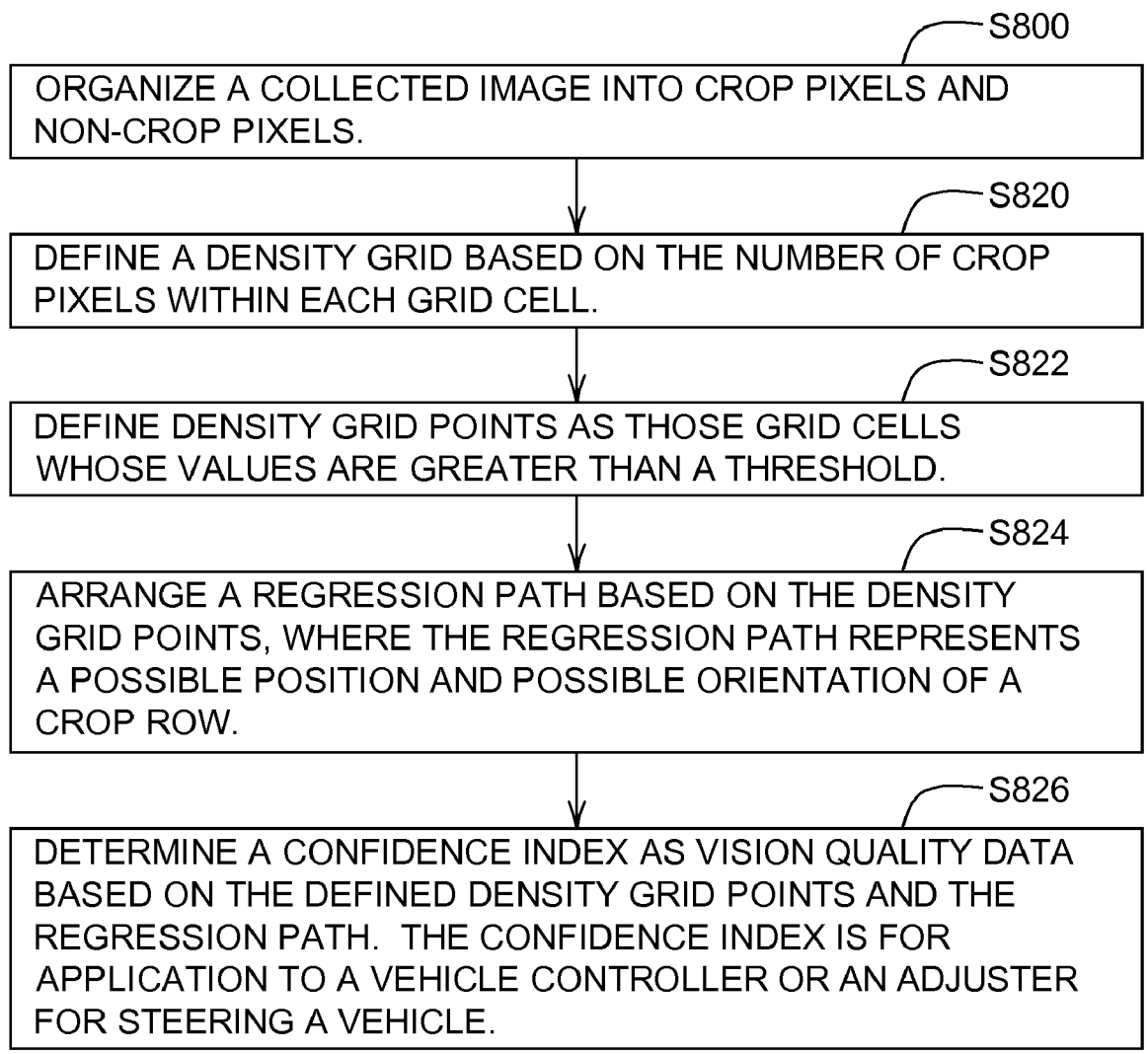
FIG. 15B is a flow chart of one embodiment of a method for guiding a vehicle based on vision guidance data from vision data (e.g., stereo vision data).

FIG. 15B is a flow chart of one embodiment of a method for guiding a vehicle based on vision-derived location data from vision data (e.g., stereo vision data). The method of FIG. 15 starts in step S800.

In step S800, a vision module 22, image processing system 33, or organizer 70 organizes a collected image into crop pixels and non-crop pixels. For example, the vision module 22, image processing system 33, or organizer 70 may use color discrimination to sort or organize pixels into crop pixels and non-crop pixels. As previously noted, FIG. 9 provides an illustrative example of the organization of the collected image into crop pixels and non-crop pixels.

In step S820, the vision quality estimator 220 or density grid definer 90 defines a density grid based on the number of crop pixels within each grid cell. For example, the vision quality estimator 220 may divide the crop pixels into a grid of cells (e.g., rectangular or hexagonal cells of equal dimensions) and count or estimate the number of crop pixels within each grid cell. In one embodiment, the filter 92 flags, marks, or otherwise stores or indicates those grid cells in which the number of crop pixels meet or exceed a particular minimum number or threshold.

In step S824, the vision quality estimator 220 or arranger 94 arranges a regression path based on the density grid points, where the regression path represents a possible position and possible orientation (e.g., a center or centerline) of a crop row.

In step S826, the vision quality estimator 220 or estimator 96 determines a confidence index as a vision quality data based on the defined density grid points and the regression path. The confidence index is applied to a vehicle controller 25 or an adjuster 110 for steering a vehicle. The method of FIG. 15 is well suited for determining a confidence index or vision quality data for a stereo vision data or stereo vision images.

The vision quality module 220 may determine or estimate a confidence index by using a combination of a moment index ($C_M$) and a clustering index ($C_C$). The moment of the density grid points around the regression path or center line is calculated by:

$$M = \sum_{i=1}^{n} \frac{d_i^2}{D_i}$$

and the moment index is given by:

$$C_M = 1 - \frac{M}{M_{max}}$$

The clustering index is calculated by inverse function of the standard deviation of the density grid points:

$$C_C = 0.8 + \frac{0.2}{\sigma_d}$$

-continued $$\sigma_d = \sqrt{\frac{\sum_{i=1}^{n}(d_i - \overline{d})^2}{n-1}}$$

Figure 16:
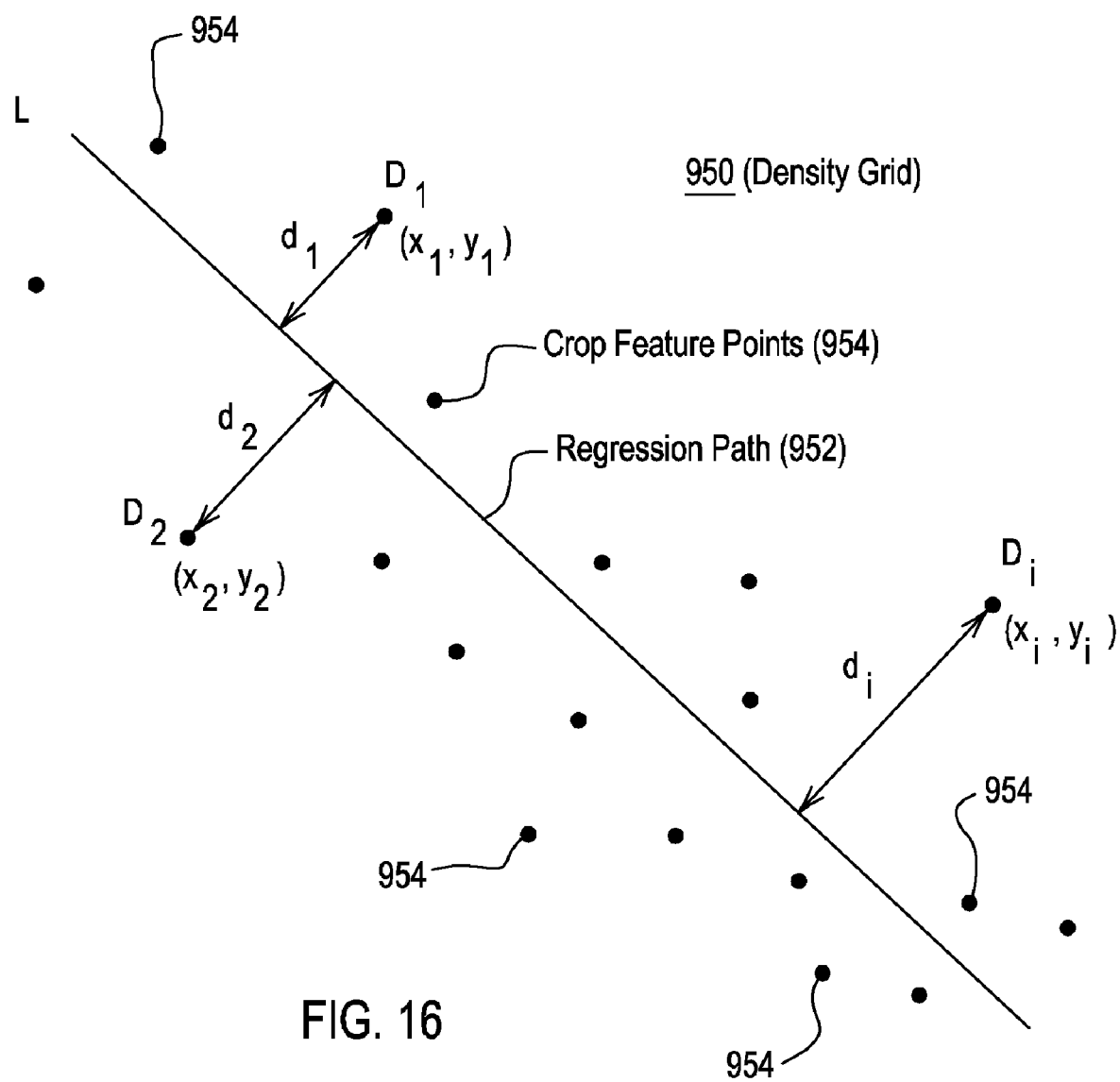
FIG. 16 is a density grid of points representing crop features or vegetation and a center line associated with a crop row.

FIG. 16 is a density grid 950 of crop feature points 954 representing crop features or vegetation and a regression path (e.g., center line) associated with a crop row. Each crop feature point 954 may represent on or more crop pixels (e.g., a cluster of crop pixels). The density grid 950 of FIG. 16 represents an illustrative example of a density grid 950 that may be associated with the vision quality estimator 220 of FIG. 15A and the method of FIG. 15B. The density grid 950 of FIG. 16 may be derived from a stereo image, for instance.

In FIG. 16, each crop feature point 954 represents a number of crop pixels that meet or exceed a minimum number, density, or threshold. As illustrated, crop feature points $D_1$, $D_2$ and $D_i$ are identified and are located at $x_1, y_1$; $x_2, y_2$; and $x_i, y_i$, respectively. The regression path 952, L, (e.g., center line or regression line) of the density grid 950 is used to estimate the position and orientation (e.g., center line or axis) of the crop rows or crop feature. In an alternative embodiment, the regression path is the estimate of the cut/uncut crop edge.

If the density grid points or crop feature points 954 are sufficiently close to the regression path 952 or within a maximum aggregate separation value, the confidence index or the vision quality data is generally acceptable or high. However, if the density grid points or crop feature points 954 are further (than the maximum aggregate separation value) from the regression path 952, the confidence index or vision quality data is low or generally unacceptable. The maximum aggregate separation value may be based on a statistical or mathematical interpretation (e.g., sum, mean, mode, or weighted average) of the distances of the crop feature points 954 with respect to normal projection (e.g., orthogonal projection) from the regression path 952. As illustrated, a first distance between crop feature point $D_1$ and the regression path is $d_1$; a second distance between crop feature point $D_2$ and the regression path is $d_2$; an ith distance between crop feature point $D_i$ and the regression path is $d_i$.

Having described the preferred embodiment, it will become apparent that various modifications can be made without departing from the scope of the invention as defined in the accompanying claims.

The invention claimed is:

1. A method for guiding a vehicle, the method comprising:
determining preliminary guidance data for the vehicle based a location-determining receiver associated with the vehicle during an evaluation time window;
collecting vision data from a vision module associated with the vehicle during the evaluation time window;
determining vision guidance data from the collected vision data;
estimating vision quality data for at least one of the vision data and the vision guidance data during the evaluation time window, the vision quality data based on a cross correlations and an r-squared value, the cross correlation being between an observed intensity profile of the vision data in a section and a reference intensity profile to determine row center positions and an r-squared value being between a regression path and the row center positions; and
adjusting the preliminary guidance data to a revised guidance data based on the vision guidance data such that the revised guidance data is registered with or generally coextensive with the vision guidance data, if the vision quality data exceeds a minimum threshold.

2. The method according to claim 1 wherein the cross correlation comprises a normalized cross correlation based on a mean cross correlation for a group of sections of the vision data, each section associated with a corresponding row center position.

3. The method according to claim 2 wherein the estimating of the vision quality data comprises:
estimating the row center positions associated with corresponding sections or subdivisions of the vision data; and
determining the regression path coinciding with the row center positions.

4. The method according to claim 2 wherein the estimating of the vision quality data comprises:
organizing a collected image or the vision data into crop pixels and non-crop pixels;
determining an intensity profile based on pixel intensity values of the crop pixels;
establishing a reference intensity profile associated with a group of crop rows or a single crop row;
subdividing the collected image into multiple sections or overlapping windows;
determining a cross correlation between the intensity profile and a reference intensity profile for each one of the sections.

5. The method according to claim 4 further comprising:
estimating a row center position associated with each one of the sections; and arranging estimated row center positions into a regression path defining a representation of a position and orientation of a crop row.

6. The method according to claim 5 further comprising:
determining an r-squared value between the regression path and the row center positions; and
determining vision quality data based on the determined cross correlations and the r-squared value for application to a vehicle controller or adjuster for steering of a vehicle.

7. The method according to claim 1 wherein the preliminary guidance data and the revised guidance data, each comprise at least one of heading data, off-track data, and curvature data.

8. A method for estimating a vision quality data for guidance of a vehicle, the method comprising:
organizing a collected image of image data into crop pixels and non-crop pixels;
determining an intensity profile based on pixel intensity values of the crop pixels;
establishing a reference intensity profile associated with a group of crop rows or a single crop row;
subdividing the collected image into multiple sections or overlapping windows;
determining a cross correlation between the intensity profile and a reference intensity profile for each one of the sections;
estimating a row center position associated with each one of the sections;
arranging estimated row center positions into a regression path defining a representation of a position and orientation of a crop row;
determining an r-squared value between the regression path and the row center positions; and
determining vision quality data based on the determined cross correlations and the r-squared value for application to a vehicle controller or adjuster for steering of a vehicle.

9. The method according to claim 8 wherein the regression path comprises a path selected from the group consisting of a generally linear path, generally curved path, and a contour path.

10. The method according to claim 8 wherein the regression path comprises a generally linear path and wherein the r-squared value indicates a degree of linearity of the row center positions with respect to the regression path.

11. The method according to claim 8 wherein the reference intensity profile comprises a sinusoidal reference intensity profile.

12. The method according to claim 11 wherein peak cross correlations correspond to the row center positions of corresponding crop row sections.

13. The method according to claim 8 wherein the crop row comprises a windrow.

14. The method according to claim 8 wherein the reference intensity profile comprises a Fermi function or a step function.

15. The method according to claim 14 wherein the width of Fermi function is proportional to a width of a windrow.

16. The method according to claim 8 wherein the vision quality data is regarded as high or adequate for guidance of the vehicle if the cross correlation meets or exceeds a first minimum threshold and if the r-squared value meets or exceeds a second minimum threshold.

17. The method according to claim 8 wherein the vision quality data is regarded as low or deficient for guidance of the vehicle if the cross correlation is less than the first minimum correlation threshold or if the r-squared value is less than the second minimum threshold.

18. The method according to claim 8 wherein the cross correlation comprises a general image cross correlation determined in accordance with the following equation:

$$r(d) = \frac{\sum_{k=0}^{N}\{(I(k)-\bar{I})*(T(k+d)-\bar{T})\}}{\sqrt{\sum_{k=0}^{N}(I(k)-\bar{I})^2} * \sqrt{\sum_{k=0}^{N}(T(k+d)-\bar{T})^2}}$$

where r(d) is the general image cross-correlation function between the observed intensity profile I(k) and the reference intensity profile T(k+d), d defines the location of the reference intensity profile, $\bar{I}$ is the mean intensity of the observed intensity profile, $\bar{T}$ is the mean intensity of the reference intensity profile, and $r(d_{max})$, is the approximate center position of any crop row within the image.

19. The method according to claim 8 wherein the cross correlation comprises a normalized cross correlation ($r_{cross\_norm}$) determined in accordance with the following equation:

$$r_{cross\_norm} = \begin{cases} \left(\frac{\bar{r}_{cross}}{r_{cross\_ref}} - r_0\right)/(1-r_0) & r_{cross\_ref} \times r_0 \leq \bar{r}_{cross} \leq r_{cross\_ref} \\ 1 & \bar{r}_{cross} \geq r_{cross\_ref} \\ 0 & \bar{r}_{cross} \leq r_{cross\_ref} \times r_0 \end{cases}$$

where $\bar{r}_{cross}$ is a mean cross correlation from a group of sections, $r_{cross\_ref}$ is the reference cross correlation, typically obtained from an initial reference image, and $r_0$ is a minimum cross correlation.

20. The method according to claim 8 further comprising: collecting the image data via a monocular vision imaging unit.

21. The method according to claim 8 wherein the sections comprise overlapping windows or subdivisions of the image data.

22. A system for guiding a vehicle, the system comprising:
a location-determining receiver for collecting preliminary guidance data for the vehicle during an evaluation time window;
a vision module for collecting vision data during the evaluation time window and for determining vision guidance data from the collected vision data;
a vision quality estimator for estimating vision quality data for at least one of the vision data and the vision guidance data during the evaluation time window, the vision quality data based on a cross correlations and an r-squared value, the cross correlation being between an observed intensity profile of the image data in a section and a reference intensity profile to determine row center positions and an r-squared value being between the regression path and the row center positions; and
an adjuster for adjusting the preliminary guidance data to a revised guidance data based on the vision guidance data such that the revised guidance data is registered with or generally coextensive with the vision guidance data, if the vision quality data exceeds a minimum threshold.

23. The system according to claim 22 further comprising a cross correlation module for determining a normalized cross correlation as the cross correlation, the normalized cross correlation based on a mean cross correlation for a group of sections of the image data, each section associated with a corresponding row center position.

24. The system according to claim 23 wherein the vision quality estimator further comprises:
a row center estimator for estimating the row center positions associated with corresponding sections or subdivisions of the image data; and
an arranger for determining the regression path coinciding with the row center positions.

25. The system according to claim 23 wherein the vision quality estimator comprises:
an organizer for organizing a collected image into crop pixels and non-crop pixels;
an intensity profile module for determining an intensity profile based on pixel intensity values of the crop pixels;
a data storage device for storing a reference intensity profile associated with a group of crop rows or a single crop row;
a subdivider for subdividing the collected image into multiple sections or overlapping windows;
a cross-correlation module for determining a cross correlation between the intensity profile and a reference intensity profile for each one of the sections.

26. The system according to claim 25 further comprising:
a row center estimator for estimating a row center position associated with each one of the sections; and
an arranger for arranging estimated row center positions into a regression path defining a representation of a position and orientation of a crop row.

27. The system according to claim 26 further comprising:
a variation evaluator for determining an r-squared value between the regression path and the row center positions; and
an estimator for determining vision quality data based on the determined cross correlations and the r-squared value for application to a vehicle controller or adjuster for steering of a vehicle.

28. The system according to claim 22 wherein the preliminary guidance data and the revised guidance data, each comprise at least one of heading data, off-track data, and curvature data.

* * * * *